United States Patent [19]
Gullickson

[11] 3,881,390
[45] May 6, 1975

[54] SIGHT AND SOUND MUSICAL INSTRUMENT INSTRUCTION WITH EXPANDED CONTROL CAPABILITIES

[76] Inventor: Cecil F. Gullickson, 2018 Fosgate Dr., Winter Park, Fla. 32789

[22] Filed: Nov. 21, 1973

[21] Appl. No.: 418,211

Related U.S. Application Data

[63] Continuation-in-part of Ser. No. 182,484, Sept. 21, 1971.

[52] U.S. Cl. .................................... 84/478; 360/79
[51] Int. Cl. ............................................ G09b 15/08
[58] Field of Search ........ 84/470, 477 R, 478; 35/6; 340/147 P, 324 R, 324 M; 360/4, 79

[56] References Cited
UNITED STATES PATENTS

| | | | |
|---|---|---|---|
| 3,377,716 | 4/1968 | Schmoyer | 84/478 |
| 3,482,480 | 12/1969 | Decker | 84/478 |
| 3,604,299 | 9/1971 | Englund | 84/1.03 |
| 3,664,036 | 5/1972 | Boswell et al. | 84/478 UX |
| 3,771,406 | 11/1973 | Wheelwright | 84/478 UX |

*Primary Examiner*—Richard B. Wilkinson
*Assistant Examiner*—John F. Gonzales
*Attorney, Agent, or Firm*—Julian C. Renfro

[57] ABSTRACT

A visual and aural apparatus for teaching certain musical instruments, including keyboard instruments and fretted instruments having lamps contained within certain keys or frets of such instruments and programmed instructional information arranged to instruct the student and to illuminate the keys or frets to be played. The invention includes a novel binary sequential decoding system for decoding instructional information prerecorded on magnetic tape, such as in a casette, in the form of a binary sequential code, such system being economically implemented in a preferred embodiment using logic elements and therefore adaptable to large scale integration (LSI). The decoding system operates control circuitry having matrices and multiplexing devices to allow a very large number of lamps and other devices to be controlled from a smaller number of code words, and to minimize the number of output terminals required to control such lamps. This latter feature makes possible the implementation of the entire decoding and substantial portions of the control circuits within a single LSI package.

34 Claims, No Drawings

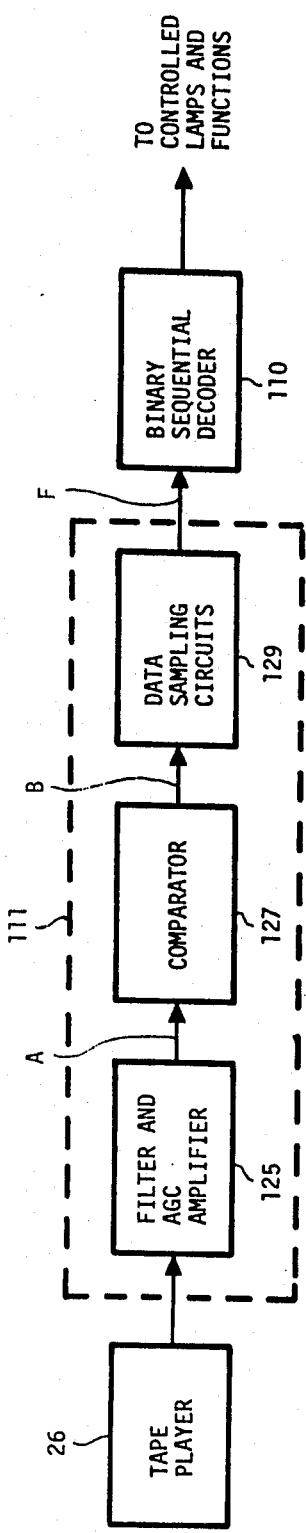
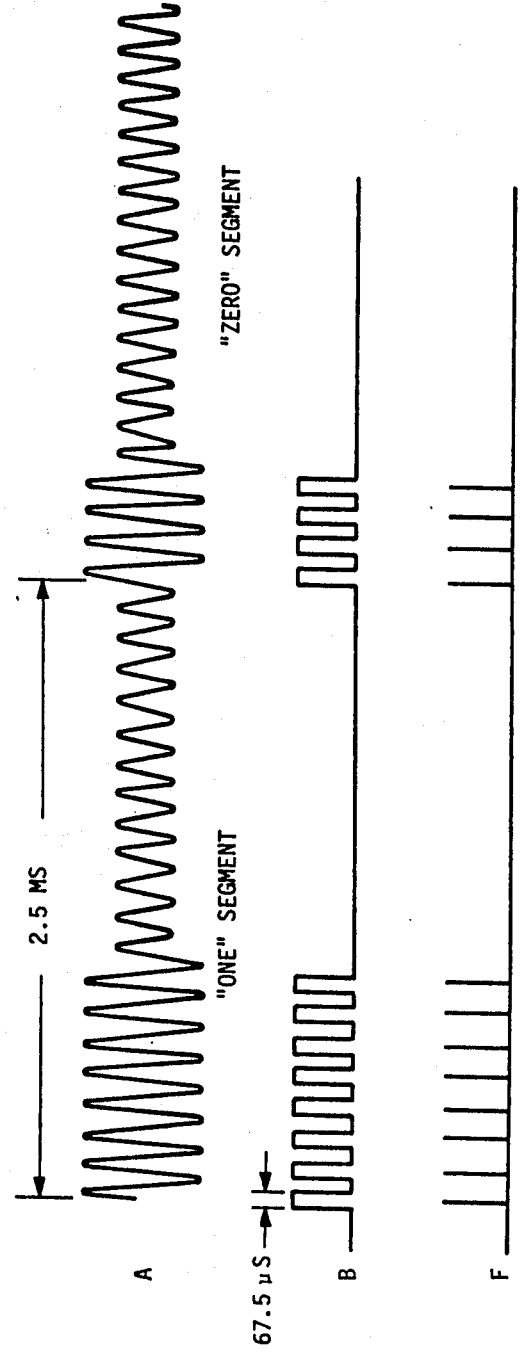
FIG. 9
FIG. 12

SIGHT AND SOUND MUSICAL INSTRUMENT INSTRUCTION WITH EXPANDED CONTROL CAPABILITIES

REFERENCE TO RELATED INVENTIONS

This is a Continuation-in-Part of my copending application entitled "Sight and Sound Musical Instrument Instruction," filed Sept. 21, 1971, Ser. No. 182,484. It is also related to the subject matter of my U.S. Pat. No. 3,415,152 entitled "Music Teaching Aid," as well as to my U.S. Pat. No. 3,731,582 entitled "Sight and Sound Teaching Aid for Keyboard Instruments".

BACKGROUND OF THE INVENTION

1. Field of the Invention

This invention pertains to aids to be used by an amateur musician when learning to play a keyboard or fretted instrument, so that he or she can be instructed as to the precise location of keys or frets that are to be associated with certain frequencies or melodies.

2. Description of the Prior Art

A number of aids for use with keyboard instruments have been proposed in the past, but these have usually been either comparatively ineffective, or else have been large and expensive. Certain tapes have been available that contained specific instruction as to the manner in which the beginning musician placed his hands on the keyboard, and some of these tapes have even contained tones such that the student could ascertain when he had selected the proper note to be played. Other tapes have contained accompaniments such that the student could play along with the tape, with the melody he provided hopefully blending with the accompaniment the tape was supplying.

Other more elaborate means have been proposed which would entail the use of an instructor's keyboard and a student's keyboard utilized in conjunction with a tape playing arrangement. Some advantages are made possible by such an arrangement, such as the instructor being able to interpose additional teaching assistance over and above that being presented by the tape. However, few purchasers can afford the expense involved in an arrangement of this type, and the space necessitated by such a device is so great as to make it impractical for use in the average home.

The following patents have approached this subject matter. U.S. Pat. No. 3,377,716, issued to Schmoyer, teaches a visual and aural instructional method and apparatus. He requires a coding device having a large number of different frequency tones and complementary filters in his playback system. Such apparatus is quite bulky and expensive and is limited in speed of response. Chapman, et al. in U.S. Pat. No. 3,141,243 describes an automatic tutorial system that uses coded magnetic tape. However, the typing of coding used is not clearly described and appears to use a type of code group blocks, possibly such as used in business computor tapes and appears difficult to adapt to an economical musical instructional device.

U.S. Pat. No. 3,604,299 issued to Englund discloses a method and apparatus for automatically playing a recorded musical selection on a piano or organ. He utilizes a coded signal having three different analog amplitude levels to indicate ON, OFF and SYNC. This approach requires analog threshold devices for decoding purposes. Soanes et al. in U.S. Pat. No. 3,552,256 describes a musical instrument teaching device. Teaching information is recorded as a punched paper tape and a tape reader is used for playback. The tape reader is advanced by the student playing the proper note. This device obviously cannot teach proper timing rhythm or tempo and is therefore severely limited.

As will be seen hereinafter, my invention has none of the drawbacks inherent in the known prior art.

SUMMARY OF THIS INVENTION

This invention represents a highly satisfactory yet low cost arrangement for indicating to beginning musicians the precise locations of certain manually operated keys on the keyboard of a musical instrument, which keys, when struck in response to the illumination thereof, bring about the student playing a simple or eventually a complicated melody. Further, the frets of a stringed instrument can likewise be selectively illuminated so as to provide instruction. The illumination means is activated by a decoder that is arranged to receive coded information from a programmable player instruction apparatus. Preferably a magnetic tape player is used to play a prerecorded tape, such as a cassette type tape. Thus, in response to the decoder means being subjected to certain information contained on the tape, the illumination means associated with the keys or frets are caused to be illuminated in a manner appropriate to the playing of a selected melody or musical program.

Although this invention can be put to a wide range of uses, a preferred arrangement involves utilization in conjunction with an instructional tape that is prerecorded to contain voice instruction and/or accompaniment music as well as accompanying coded information, with latter information causing the sequential illumination of the lighting means associated with certain keys or frets of the instrument simultaneously with the voice instruction, or in concert with accompaniment music. As should quickly become apparent, this amounts to a sight and sound instruction such that a vocal recording can explain to the student the technique that is to be developed, and the keys or frets illuminated at an appropriate time so as to unerringly indicate the location of the keys or frets upon which the student should place his or her fingers in order to bring about the playing of the chosen piece of music.

It should also be noted that my invention, in addition to indicating the keys to be played by means of illumination of the specific keys, indicates the duration for which a note is to be held and the repetitiveness of a note when required. To this end, I have advantageously provided a high speed of operation of my system such that the rate of repetition of a single note or a series of notes is significantly higher than the ability of a player to follow. This is not to say that this high speed capability is necessarily used, but rather that it is provided so as to ensure that my invention is not limited in this respect.

Quite obviously, this invention can be utilized with a wide range of instruments, including piano, harpsichord, and organ, and can include the illumination of either or both keyboards of the organ, and even include the bass pedals that may be involved. Fretted instruments can of course include guitar, banjo, ukelele and others.

In contrast with certain prior art arrangements, the practice of my invention entails the use of no additional keyboards requiring the presence of the instructor, and because the present sight and sound instruction amounts to such a highly effective low cost technique, it is possible for the beginning musician to be playing recognizable melodies at a much faster rate than was ever previously possible. The instructional tapes can be played either by a tape player built into the keyboard instrument, or alternatively by an ancillary piece of equipment. Quite obviously, the tape can be played over and over at the behest of the student until such time as he or she has mastered each portion of the melody.

In the typical instance, the tape is a magnetic tape played on an appropriate tape player, and although the tape can be a single channel tape containing both aural instruction as well as coded information to trigger the illumination means, I preferably use a two channel tape in which one of the channels contains voice instruction, and the other channel contains the electronic data utilized for contemporaneously bringing about the illumination of certain selected keys, frets, or other functional indication lights as a helpful supplement to the spoken instruction. There are obviously a wide variety of ways in which my sight and sound instructional technique can be utilized in the home for instructing a student in the playing of a musical instrument.

In the interests of providing an arrangement which is practical and economical and that can be afforded by the average home, I preferably utilize a stereo type tape cassette player and an instructional tape cassette as a programming means and analog data storage means wherein the voice and aural instruction is recorded on one track of the stereo tape and the coded data for operation of the instructional illumination means and associated functions is recorded on a second track of the stereo tape. Such stereo cassettes and players are readily available at low cost. Furthermore, the cassettes use four tracks on the tape arranged to play one pair of tracks in one direction of the tape movement, and to play the other pair of tracks when the tape movement is reversed and the playback tape heads shifted relative to the position of the tape tracks. This is commonly accomplished by removing the cassette from the player, turning it over, and reinserting in the player.

In order to extract the information prerecorded upon the tape and utilize it in the most straightforward manner for the selective illumination of the bulbs, I preferably utilize a binary sequential decoding system involving input signal conditioning circuitry, display decoder and memory, or buffered storage, with latter being connected to suitable display and drivers. Preferably, the tape is prerecorded with data prerecoded in a sequence of encoded binary data signals grouped in frames. The data is in the form of a 8 KHz sine wave containing sequential binary amplitude and width modulated data. Two separate amplitudes are involved, with a smaller one being the carrier and the larger amplitude representing data to be interpreted and utilized by the aforementioned decoding system. Suitable means are utilized to extract synchronization type information contained on the tape, which information is employed to assure proper operation. In a first exemplary arrangement, I provide a code frame with a duration of 1/10 of a second on the tape and divide the frame into 40 equal data segments, with one of these being concerned with synchronization. Hence, I can easily control 39 functional or display elements, such as may include illumination means under or adjacent two or so octaves of keys, or adjacent certain organ stops and even associated with the bass pedals in order that the student will be instructed in a most dynamic manner. Although the illumination means can be ordinary incandescent bulbs of small size, such means can also include light emitting diodes, neon lamps, or other suitable light emitting devices. While this arrangement utilizes 40 data segments in one code frame, a larger or smaller number of segments can be used.

Although the frame length is obviously not critical, I prefer a frame length of 1/10 second, for it allows a lamp to be illuminated from a shortest interval of 1/10 second, to as long an interval as required since, as will be explained hereinafter, storage or memory means is used to hold a lamp in the illuminated condition from one frame to the next. Thus, the note of the shortest feasible duration can be indicated. It should be clear that in various other applications of my invention, this frame length can be selected to have a shorter or longer duration as may be required. The division of the 1/10 second frame into 40 segments of 2.5 msec duration allows use of a sinusoidal carrier frequency that falls within the useful frequency response range of low-cost cassette type tape recorders and players. However, it is clear that the number of segments may be selected over a reasonable range without exceeding the tape frequency limitation. The 40 segments chosen here give sufficient control signals for a piano or small organ.

In a second exemplary arrangement particulary suited to a larger organ application, I provide a novel encoding method whereby more illumination means can be controlled than the basic number of data segments in one frame. This method utilizes a plurality of matrices in the decoder such that data present in two of the data segments causes an output from one matrix point. Since there are more combinations of the data segments taken two at a time than the total number of data segments, the possible illumination control functions are greater than in the first example without requiring an increase in the number of data segments in the code frame. In one example of this method, I can provide 56 outputs with a 40-segment code frame.

Significantly my invention is not limited to use with keyboard and fretted instruments of normal size, for manifestly it can be employed with items of much larger size utilized for the purpose of group instruction.

Another facet of my invention involves the use of a rhythm keyer, which is a novel device sensitive to certain information on the tape, that functions to cause the circuits carrying signals produced by the depression of chord keys as well as bass pedals to open and close in a preascertained manner, thus providing a rhythm to the melody being played by the beginning musician that he would in most instances not have the skill to provide for himself.

It is to be noted that my present invention provides an additional improvement over the invention of my copending application Ser. No. 182,484 relating to the application of my instant invention to organs or other instruments providing electronic rhythm voice generators and an automatic rhythm pattern generator. These rhythm players provide percussive or drum effects in rhythmic patterns for accompaniment of one's own playing. Some also provide rhythm patterns to chords and sometimes to bass pedals being played. In such instruments, the rate of speed of the rhythm player is commonly derived from an internal electronic clock whose frequency is adjusted by controls on the instrument console. I advantageously provide means herein for automatically disconnecting the internal clock from its associated automatic rhythm circuits and substituting programmed clock pulses derived from signals generated in the decoder of my invention. These means are responsive to programmed control and clock data recorded in the coded information channel of the magnetic tape. This improvement allows the student to utilize the internal rhythm section of his instrument operating in synchronism with the instructional tape. In contrast, without this improvement, use of the built-in automatic rhythm device during playing of an instructional tape would not be feasible due to the inevitable drift between the internal clock controlling the rhythm circuits, and the timing of the illumination means derived from the tape as well as the music and voice recorded thereon.

Another novel feature of my invention is the capability of indication of certain functional operations by means of signal lights. An example of this feature is a chord change warning light. Prior to change of illumination of one set of chord keys to another set, my invention can advantageously light a conveniently located lamp that alerts the student to expect such forthcoming change. Significantly, the chord change lamp is programmed to come on while player is still playing one chord, just prior to the time to play the new chord, to alert him of impending change, so that he can respond in time. A second example is a tape speed indicating lamp for indicating proper tape speed, which insures that the pitch of the aural output of the tape player and that of the instrument being played are identical.

In the application of my instructional device to modern electronic organs, especially when the device is built into the instrument at manufacture and therefore involved many elements in common with the normal organ circuitry, means are required to preclude electrical noise from interfering with the proper decoding of the recorded instruction information. For example, in such cases, common power supplies may be used. The organ contains many pulse circuits, tone generators, clocks, and other circuits that produce sharp transient type waveforms. These transients can be transferred into my decoder circuits at low level points through common circuits, proximity of wiring and leakage paths. Another source of noise and interference may arise when, in accordance with my invention, a low-cost stereo cassette type tape player is used. In this instance, crosstalk between channels, excessive tape hiss and lack of shielding can introduce noise into the data channel.

To obviate the noise problem, I have provided a signal conditioner consisting of an AGC amplifier, and sampling circuit between the tape player data channel output and the decoder input. The AGC amplifier consists of an operational amplifier having two parallel negative feedback paths. One feedback path includes a parallel resonant circuit, broadly tuned to the 8 KHz data carrier frequency. It therefore has a high impedance to the data carrier frequency and the sidebands due to the data modulation, and therefore the gain of the operational amplifier remains high for such frequencies. The circuit has a lower impedance for all other frequencies thereby decreasing the gain by virtue of the increased negative feedback. The result is that noise, crosstalk, transients, etc. that occur outside of the modulation frequency spectrum region are greatly attenuated. The second negative feedback path consists of a controllable impedance arranged to provide automatic gain control. The control signal is derived by rectifying the output of the operational amplifier with a suitable long time constant filter. Thus, the output of the operational amplifier is a normalized data signal whose level is relatively independent of variations in the tape playback output and is relatively free of noise outside of the data signal frequency band.

Following the AGC amplifier I have provided a comparator circuit. This circuit is biased to be responsive only to the positive going high-amplitude portions of the sinusoidal data signal. The comparator acts to square up the positive going cycles and its output is therefor a series of square waves for the data portion of a data segment and zero for the carrier-only portion of a data segment.

The output of the comparator drives the data sampling circuit. The purpose of this circuit is to provide the subsequent digital decoding circuit with a clean data bit stream, free of false noise pulses. To this end, I have provided a high speed counter having a clock approximately 30 times the rate of the 8 KHz data that samples each square wave from the comparator. The circuit counts the number of samples found in each input pulse and only accepts pulses having a predetermined duration. By choosing this duration to be slightly shorter than a normal data square wave, the sampling circuit will block shorter noise spikes, or interference signals. Therefore, the output of this circuit supplies the digital decoder with a sequence of clean, conditioned pulses free from noise or interference.

While I have described my invention in conjunction with the use of a low cost stereo type tape cassette player and a signal conditioner to eliminate noise, crosstalk and variable output problems with such a tape player, the cost to manufacture my invention could be excessive if the electronics portion were fabricated with discrete components. Therefore, I desire that the electronic portion be of such design to be implemented in a single MOS LSI package. In large volume production, such LSI packages can be manufactured at a unit cost of a few dollars, thereby achieving the important goal of supplying a low cost yet highly satisfactory instructional device.

In the second exemplary implementation described hereabove, I require 56 outputs from the electronic circuits. However, the largest LSI package available has about 40 external terminals. To reduce the number of external connections of the electronics package, yet retaining the capability of controlling 56 or more lamps or functions, I have provided an alternative implementation of my invention. This implementation uses a novel multiplexing and scanning circuit that requires only 15 output terminals to control 56 lamps. The lamps are connected in a N column by M row array or rectangular matrix with a lamp requiring a ground on its row input and a source of voltage on its column input to be illuminated. By letting N equal 7 and M 8, 56 lamps are controlled. Grounds are provided sequentially by a scanning counter that completes one scan during one data segment period. The voltage input is provided by a set of seven multiplexers having a total of 56 input lines from my decoder. The multiplexer outputs are controlled by a counter operating in synchronism with the scanning counter whereby one input signal is distributed to the proper array column input. Due to the scanning, a lamp is on for one-eighth of a segment period or for a 12.5 percent duty cycle. Where a lamp is required to be illuminated for several data frames, this duty cycle is long enough for the lamp to appear to be on continuously.

It is therefore a primary object of my invention to provide highly effective audio and visual teaching for keyboard and fretted instruments, involving novel hardware that is sufficiently economical that it can be added to an existing instrument, or incorporated by the manufacturer into such instruments at time of manufacture.

It is still another object of my invention to provide an illuminated keyboard or fret arrangement whose illumination means are selectively operated in a most economical manner in concert with aural instruction, with both the means for causing selective illumination and the aural instruction being contained on a single dual-track tape.

It is yet another object of my invention to provide an advantageous arrangement by the use of which instruction may be provided for a keyboard and fretted instrument, with the beginning musician being reached by auditory and visual means coordinated in a highly effective and interesting manner.

It is another object of my invention to provide an audio and visual instructional device using low cost components and a readily available stereo cassette tape playback unit for control of instruction.

Yet still another object of my invention is to provide a high speed decoding system for instructing beginners in keyboard or fretted instruments in a most interesting and effective manner, with the speed of response of the decoding system being such that each bulb to be lit is caused to light without hesitation, in a virtually instantaneous manner. This high speed response makes it possible to switch rhythm and drum devices in desired rhythm patterns not possible with a slower system.

It is yet still another object of my invention to provide an instructional arrangement for certain musical instruments, contained on a prerecorded tape, with any variations in speed of the tape not being of consequence to the quality of the instruction.

It is another object of my invention to provide a decoder and control circuits to control a greater number of lamps and functions than the number of data segments contained in the data frames recorded on a prerecorded tape to be used with my invention.

It is an additional object of my invention to provide a high rate of illumination of successive keys, such rate being more than sufficient to allow enjoyment by both beginning and accomplished musicians.

It is yet an additional object of my invention to provide sufficient lamps and functions to meet the requirements of modern electronic organs.

It is yet another object of my invention, when used with an instrument having an internal automatic rhythm device, to provide means for synchronizing such rhythm device with the tempo of the instructional information recorded on a magnetic tape.

It is yet a further object of my invention to provide a visual indication to the student immediately prior to a change in chord structure in the instructional program.

These and other objects, features and advantages will become more apparent from a study of the appended drawing in which:

FIG. 9 is a block diagram of the complete decoding system used in accordance with my invention;

FIG. 12 is a expanded view of a data segment containing a ONE and a data segment containing a ZERO showing certain waveforms obtained in the decoding system;

DETAILED DESCRIPTION

Figure 1:
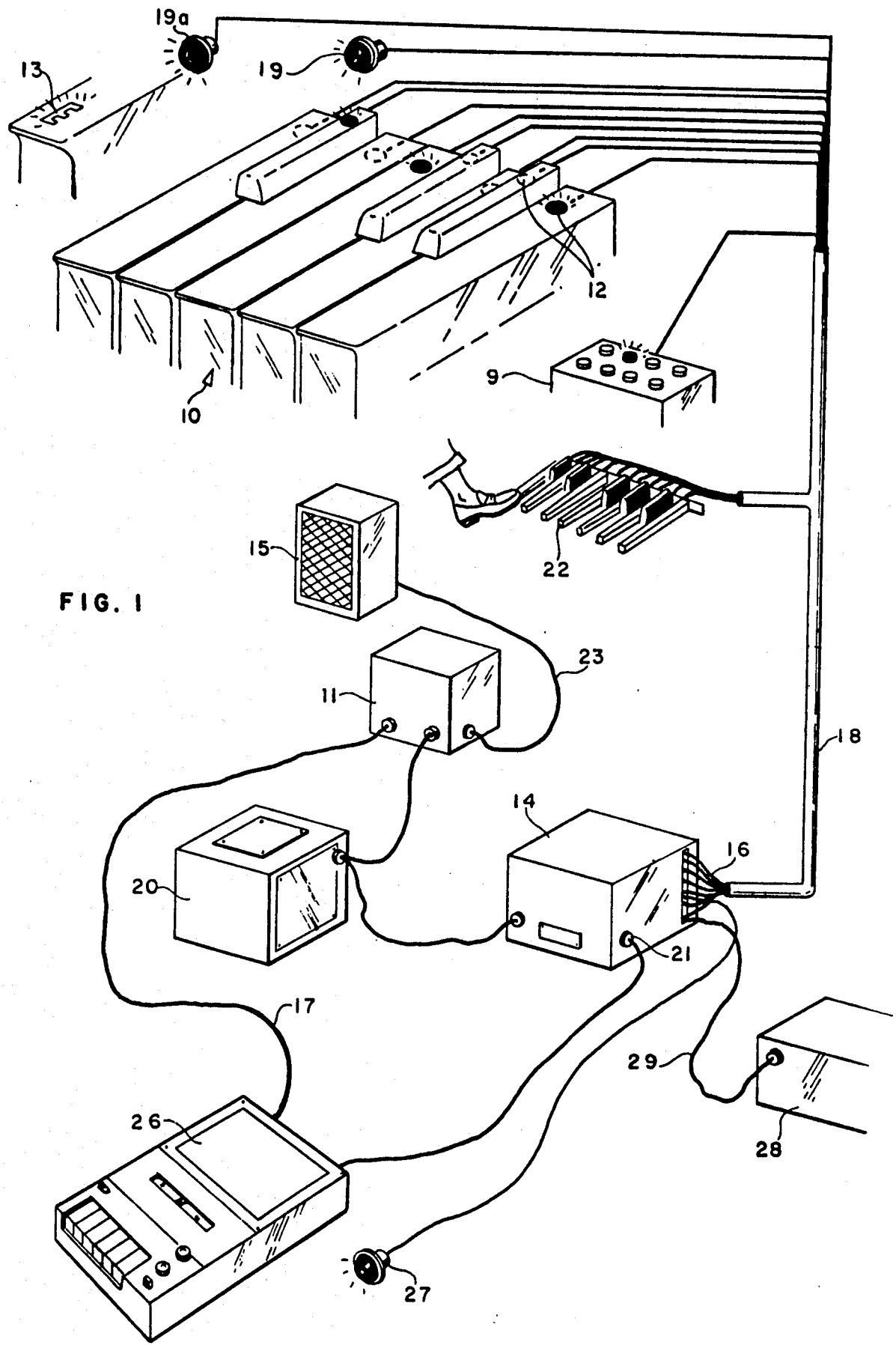
FIG. 1 is a representation of various parts of an organ with illumination means disposed to indicate the keys or controls to be played, and the elements of my invention utilized to control such illumination means as well as other functions.

Turning to FIG. 1, it will be seen that in this exemplary embodiment of this invention, I have shown a portion of the manually operated keyboard 10 of a keyboard instrument upon which instruction is to be provided to a player, who may be a beginning musician. This instrument may of course be a piano, organ, or the like. The illustrated keyboard section represents a plurality of black and white keys, with each of these keys being equipped with an illumination source. For example, individual bulbs may be contained within the confines of the keys in approximately the position indicated at 12, such that when illuminated, these bulbs clearly indicate to the student which key or group of keys is to be struck or depressed. The illumination means may be disposed below certain indicia, such as under the letter E as shown at 13 in the fragmentary view adjacent the keyboard portion 10. Wires are preferably used for carrying current from the decoding system to the illumination means.

Obviously, I am not to be limited to this arrangement, for the illumination means can be in the form of a light bar disposed above the upper rear portion of the keys, or for that matter any of a number of other individually operable illumination means can be utilized such that the keys to be struck by the student can be clearly indicated. Reference should be had to my patent entitled "Music Teaching Aid," U.S. Pat. No. 3,415,152, which issued Dec. 10, 1968, for additional pertinent details.

Most significantly, a multi-channel decoder 14 having a number of output terminals 16 is provided in FIG. 1, with the arrangement being such that each wire connected to each illumination means is also connected to a respective terminal of the decoder, this being accomplished through an electrical cable 18. The output terminals 16 also include connections for cable 29 that is wired into an optional programmable automatic rhythm device 28 (an integral part of the musical instrument). Thus, when the circuit associated with a given bulb or group of bulbs is caused to close in accordance with the operation of my invention, an electrical current is caused to flow to the selected bulbs, to cause the illumination thereof for the benefit of the student. Similarly, when the circuits associated with cable 29 and rhythm device 28 are caused to close in response to control signals in accordance with my invention, the tempo of the rhythm device is synchronized with that of the instructional information. An appropriate power supply 20 connected to the multi-channel decoder 14 is provided to supply the current that passes through the illuminating means.

Although a number of different decoders could be utilized, I prefer to use a decoder 14 utilizing a binary sequential decoding system that will be discussed in greater detail hereinafter, and it should now suffice to say that the multi-channel decoder 14 comprises input signal conditioning means that include a filter amplifier and AGC circuit, a comparator, and a data sampling circuit; and a display decoder and memory, or buffered storage, with latter being connected to suitable display drivers. Thus, upon the decoder receiving at its input 21, certain binary information from the coded information signal output of cassette tape player 26, it operates in a specific and predictable manner so as to bring about the illumination of specific ones of the illuminating means associated with the keys. It should be noted that the foot operated bass pedals 22 may contain illumination means, preferably mounted on the organ cabinet immediately above each pedal. When other binary information is received by decoder 14 the rhythm device 28 is thereby synchronized with the tempo of the illumination of the keys.

Although I could utilize a standard size tape player as an analog data storage means, I prefer to utilize a 4-track stereo cassette type tape player, utilizing tapes containing aural (audio) instruction as well as coded information for providing visual indication of the keys to be played. In accordance with one of the purposes of my invention, the aural instruction and coded information are each advantageously recorded on separate tracks of a double magnetic tape track, such as used for standard stereo recording, allowing a simple, low cost tape player to be used.

The tape player 26 output consists of two channels, one each for the voice signals and the coded information signals. The audio output from the audio channel drives audio amplifier 11 through cable 17, the amplifier feeding loudspeaker 15 via cable 23. While the use of a loudspeaker is usually preferred, it is clear that earphones or other types of audio transducers could be used.

In addition to illumination of keyboard keys, a signal lamp 19 can be installed in a conspicuous spot, preferably just above the melody keys normally played with the right hand. This lamp is advantageously controlled to light just prior to a change of left hand chord key lamp illumination, and thus provides functional information that alerts the beginning student to glance toward his left hand preparatory to change in chord note structure.

Similarly, a chord repeat signal lamp 19a is an optional signal to the student that may be included for a piano and for stringed instruments such as a guitar. Its purpose is to instruct the student to periodically replay an accompaniment chord in order that the sound of the chord is sustained. Lamp 19a is preferably of a contrasting color to the other indicator lamps and is programmed to turn on a very short period of time before a chord is to be repeated by the pianist or guitarist. The lamp will remain on for the desired sustaining time and turn off when chord is completed. The lamp is, of course, programmed by recording a data control signal at the appropriate times on the instructional tape. While I have shown chord repeat signal lamp 19a in FIG. 1 in conjunction with the electronic organ used to illustrate my invention, this is for purposes of illustration and explanation only. Since the chords on an electronic organ are sustained by the student as long as the chord button lamps are illuminated, this repeat function is not needed and therefore its use is limited to the piano and stringed instruments. A signal lamp 27 can be mounted adjacent to the tape player. A speed monitoring circuit in decoder 14 causes illumination of this lamp when the tape speed from tape player 26 is normal so that music recorded on the tape will be in tune with the organ notes being played.

Also shown in FIG. 1 is a chord button box 9, such as utilized in some organs to play a complete chord by depressing a single button. For such instruments, lamps can be mounted within the buttons to indicate when such buttons are to be operated.

As should now be apparent, the beginning musician can obtain a prerecorded instructional tape that will contain aural instruction that he or she can hear, such as over the loudspeaker 15, and by virtue of my invention, he or she can also simultaneously see certain keys of the keyboard illuminated, thus specifically indicating which keys should be struck or depressed at a certain time in order to bring about the playing of a chord or melody forming a part of the taped instruction. When the instrument is equipped with an automatic rhythm device 28, the student may utilize such device to provide rhythmic accompaniment along with his elementary manual playing, thereby providing entertaining motivation to the beginner.

Figure 2:
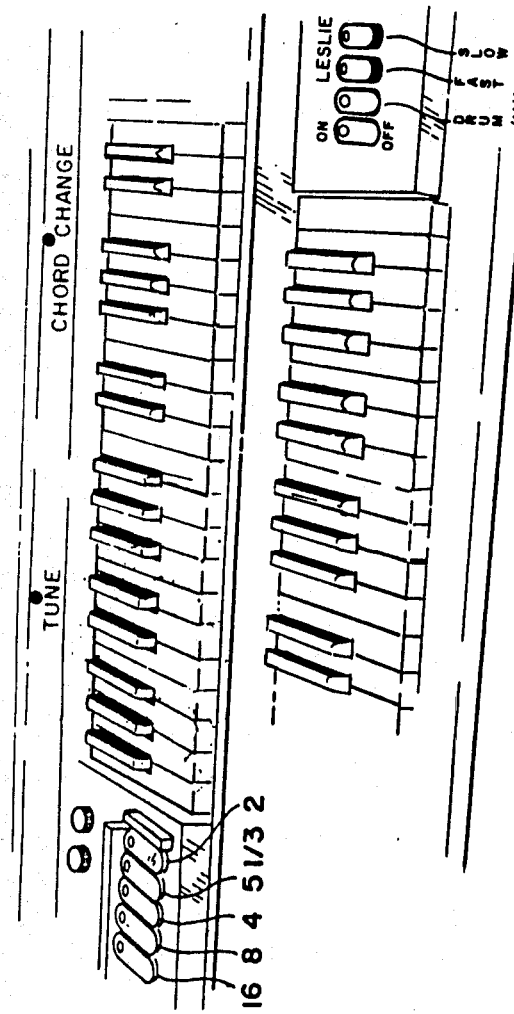
FIG. 2 is a representation of a portion of the keyboard of a two manual organ, with illumination means disposed at various locations thereon so that for example the stops to be actuated and the notes to be played can be indicated to the beginning musician.

Turning to FIG. 2 it will there be seen that I have shown a keyboard arrangement of a type utilized with a two manual organ, although if desired, a single manual organ or piano could be adapted to utilize the teachings of this invention. Inasmuch as is afterward explained, the illustrating embodiment of my invention involves a decoding arrangement that separates each one tenth of a second into 40 equal segments, thus making 39 display or functional elements associated with an organ or the like available to be selectively actuated after one segment has been used for synchronization purposes. For example, lights may be used in association with a keyboard, the organ control switches, and the bass pedals. One particular arrangement involved the use of 12 chord lights, 18 melody lights and 9 switch lights. If a larger decoder arrangement is used, more lights can be available to be selectively illuminated. In FIG. 2 it will be seen that I have provided bulbs in several selected locations, including keys, stops, and certain switches, but I am not of course to be limited to the illustrated arrangement.

Figure 3:
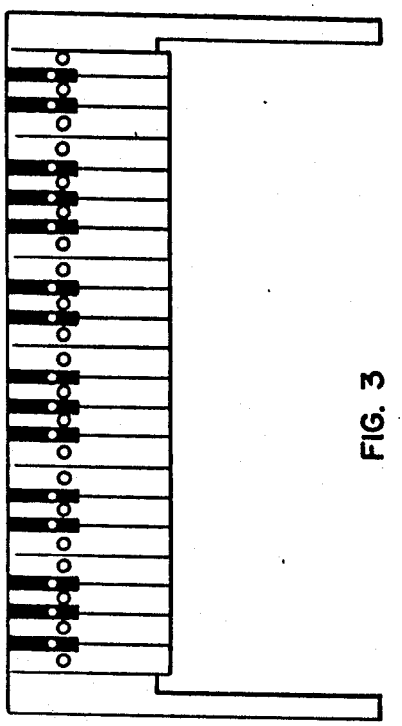
FIG. 3 is a representation of a large instructional keyboard equipped with selectively illuminated bulbs or the like in or adjacent the keys of the keyboard, thus making this device well suited for classroom instruction.

Turning to FIG. 3, it will there be seen that I have provided a large display type keyboard suitable for classroom instruction, and in this instance I can, for example, arrange for each of the 36 keys depicted to be selectively lighted in a manner that will be more fully described hereinafter.

Figure 5:
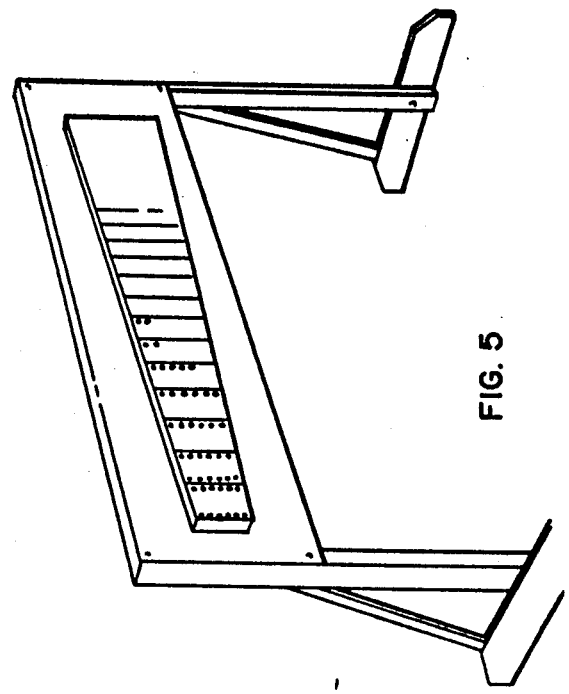
FIG. 5 is a representation of a large fret board provided with selectively illuminated bulbs suitable for classroom instruction.
Figure 4:
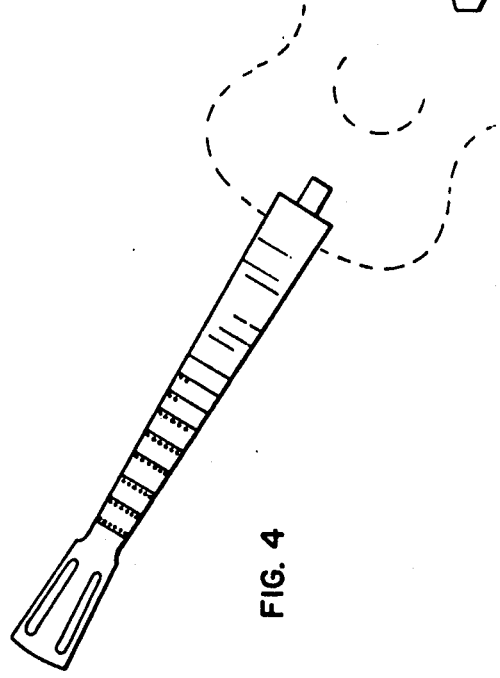
FIG. 4 is a showing of a fret board of a stringed instrument with selectively illuminated bulb means being utilized thereon for the instruction of beginning musicians.

FIG. 4 makes it apparent that my invention can be used on the necks of fretted instruments, involving for example the use of a large number of bulbs at selected locations adjacent the frets that would be fingered by a student learning to play a guitar, ukelele, banjo and the like. FIG. 5 illustrates on a large instructional type board, how the frets may be selectively illuminated for classroom instruction purposes.

It will also be obvious that the display boards shown in FIGS. 4 and 5 can be used in conjunction with arrangements provided for the entertainment of groups or audiences.

Figure 6:
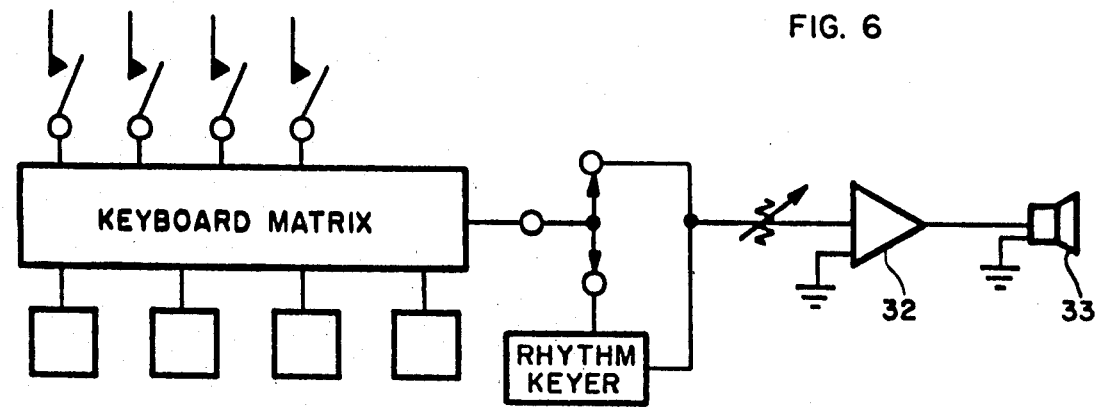
FIG. 6 is a block diagram of a rhythm keyer arrangement in accordance with this invention.

Turning to FIG. 6 it will there be seen that I have depicted an optional rhythm keyer device that may be utilized in accordance with my invention to provide rhythm to the musical selections being played, thus to accomplish the provision of rhythms to the music of a beginning musician, involving a skill level not otherwise available to such musician. A Keyboard Matrix is represented in this figure, below which are symbolically represented a number of keys, and above which are the associated switches operated by such keys. The output of the Keyboard Matrix is to a Rhythm Keyer, which is typically placed in the common lead of the bass pedals and/or the lower keyboard of an organ, with the function of this device being to interrupt the tones of the chords and/or the bass being played in accordance with predetermined rhythm patterns that were placed as data on the tape. The output from the Rhythm Keyer is of course connected to an amplifier 32 and thence to a speaker 33.

Figure 7:
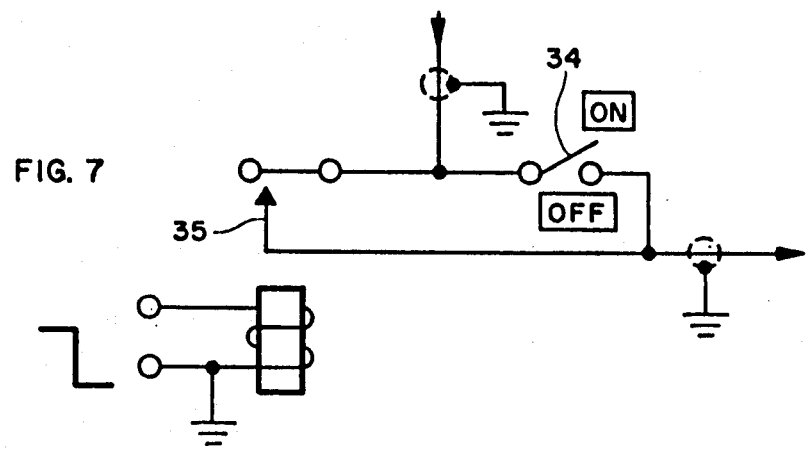
FIG. 7 is a view to a larger scale of the principal portion of the rhythm keyer.

FIG. 7 reveals in greater detail the important portions of the rhythm keyer, and when the switch 34 is in the "on" position illustrated, the rhythm keyer will be operated when signals from the tape are processed by the decoder and directed to the terminals of the winding of relay 35. The relay 35 may be arranged to close upon receiving a suitable signal from the decoder, and automatically open at the instant the signal is removed, causing signals coming from the keyboard to flow to the amplifier 32 and speaker system 33 for the duration of the time the relay is closed. In other words, information on the tape closes and opens the relay in response to a pre-recorded pattern and in a manner serve to cause the musical tones reaching the speaker 33 to be modulated with a suitable rhythm. Musical tones reach the amplifier and speaker uninterruptedly when the switch 34 is turned off.

Figure 8:
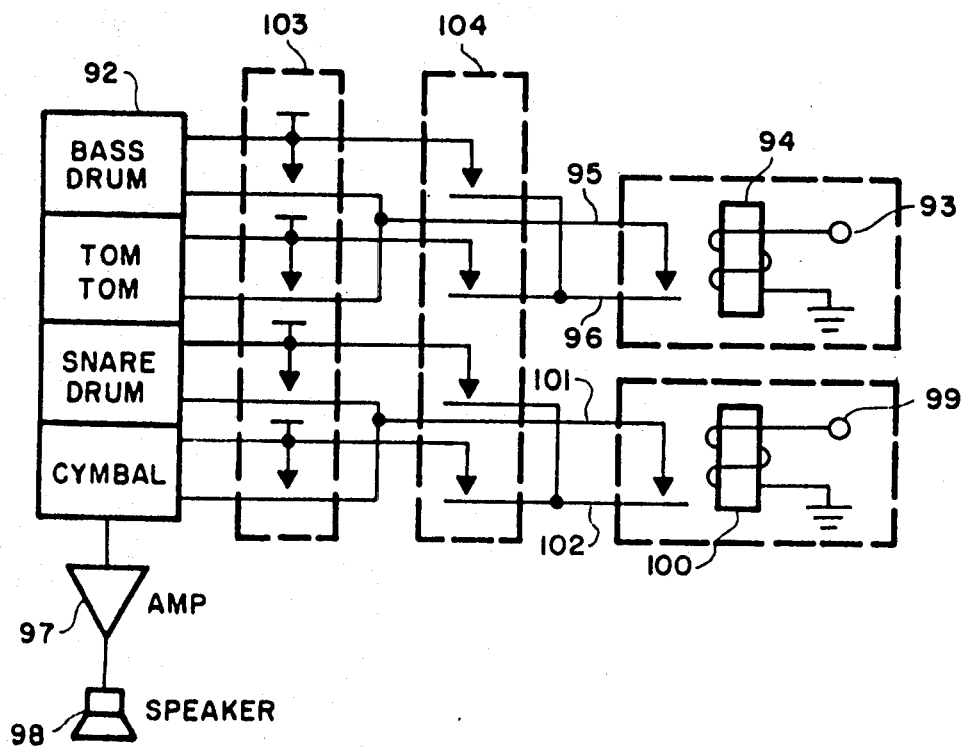
FIG. 8 is a representation of a drum rhythm keyer that may be used in accordance with my invention.

In a somewhat similar manner, pre-recorded information on the tape can serve to close and open two similar relays for the purposes of rhythmically keying percussion sounds emanating from an electronic drum device 92 contained within an electric organ for example. Electronic drum and trap audio generator devices are of course currently available, which provide electronically simulated sounds suitable for use with organs and the like. As depicted in FIG. 8, these sounds usually include a bass drum, wood block, tom-tom, snare drum, and cymbal. A push buttom 103 may in accordance with conventional design be used to manually key the individual sounds, and in keeping with the teachings of this invention, a selector switch 104 may be provided such that the desired sound or sounds may be obtained in accordance with the tape being played.

When a signal from the decoder is received by terminal 93, relay 94 closes the circuit between leads 95 and 96, causing any preselected drum sounds (bass drum or tom-tom) to be keyed, thence routed to the audio-amplifier 97 and finally to the speaker 98 of FIG. 8.

Likewise, a signal from the decoder arriving at terminal 99 will activate relay 100, thereby closing circuit 101, 102, and keying snare drum and/or cymbal. The selector switch arrangement 104 represents a construction whereby the operator at his or her election may selectively cause the bass drum and/or the tom-tom to be connected to lead 96, and similarly, may cause the snare drum and/or the cymbal to be connected to lead 102. It can therefore be seen that pre-recorded data emanating from the tape player can cause the decoder to put out a signal to leads 93 and/or 99, thereby causing a pre-recorded drum rhythm pattern to be automatically played, without it being necessary for the operator to operate manual switches 103.

Drum rhythm patterns usually consist of a down beat and an up beat effect. As an example a simple foxtrot rhythm pattern requires one down beat followed by one up beat, thusly 1↓, 2↑, 1↓, 2↑, etc.

The bass drum is then played on the 1 or down beat with snare drum and/or cymbal most often used exclusively on the up, or 2 beat. It is because of this fact that I find it desirable to use the selector switch arrangement shown in FIG. 8 in my drum rhythm playing device, so that one part of the percussion device can function to key the down beat effects, and the other part function to key the up beat effects.

Turning now to FIG. 9, I show a block diagram of a preferred decoding system used in my invention. The tape player 26 is arranged to play a tape upon which pre-recorded digital information has been placed. The output of the tape player 26 indicated is from the tape track containing such digital information. Before decoding the digital information, a signal conditioner 111 normalizes the signal, removes noise and interference, converts the signal to a set of square waves and supplies a clean, noise-free data bit stream to binary dequential decoder 110. The signal conditioner 111 consists of an input operational amplifier containing a noise and spurious signal filter and an automatic gain control (AGC) 125, a comparator circuit 127 for squaring certain sine wave signals, and a data sampling circuit 129 that discriminates against noise pulses by virtue of the difference in the width of the squared sine waves and the noise pulses.

To be able to explain more fully the operation of the signal conditioner 111 and the decoder 110, I will now describe the unique binary coding used in accordance with my invention. Each 1/10th of a second represents a data frame divided into 40 equal data segments of 2.5 ms duration. The first segment of a data frame is used for synchronization and the remaining 39 data segments are used for control of illumination means and other functions.

Figure 10:
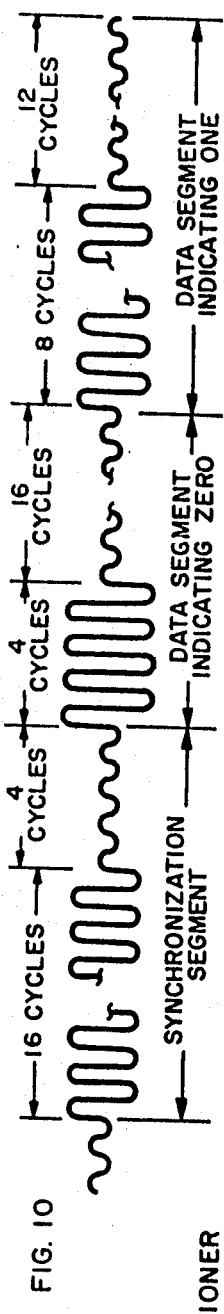
FIG. 10 is a view of the waveform provided by a prerecorded tape to the decoding system of FIG. 9, with the various intelligence-containing portions of the waveform being called out.

The data is recorded in the form of an analog 8 KHz sinusoidal carrier wave containing sequential binary width and amplitude modulated data. As will be seen in FIG. 10 the recorded sine wave has two separable amplitudes, with the smaller being the carrier and the larger amplitude being the data. The first segment, which represents sync, has a duration of 16 cycles. With one of the 40 segments being used for sync, this leaves 39 segments for information. FIG. 10 makes clear a number of the relationships utilized herein.

Each segment has a duration of 2.5 ms as derived from 20 cycles of the carrier. The frame sync (segment) has a high amplitude for 2 ms, (16 cycles) leaving 4 cycles of 8 KHz at the low amplitude before the next word. Each successive segment in the data frame contains either 4 or 8 cycles of high amplitude information. A segment containing 4 cycles of high amplitude represents a ZERO or a non-operate condition for the lamp or function associated with that segment. A segment containing 8 cycles of high amplitude represents a ONE or operate condition for its associated lamp or function.

Figure 11:
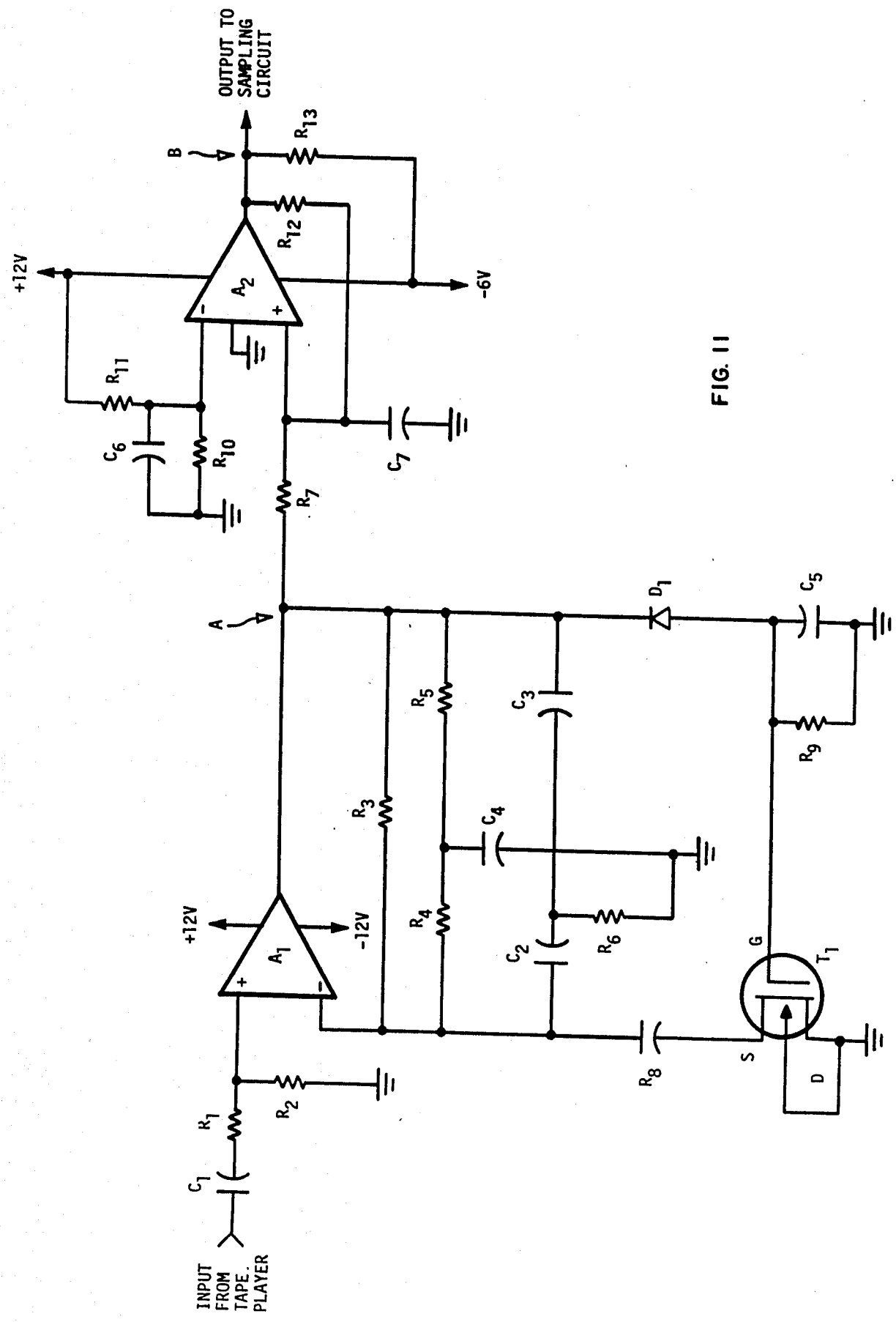
FIG. 11 is a schematic diagram of the filler and AGC amplifier, and comparator used in my decoding system.

The tape player 26 therefore produces an analog signal having the form described above and is connected to the input of the tuned AGC amplifier 125 shown in schematic form in FIG. 11. Amplifier $A_1$ which may be a type 741 is an operational amplifier having two parallel feedback circuits. One such circuit is a parallel T circuit comprising $R_4$, $R_5$, $C_4$, $C_2$, $C_3$, and $R_6$. The resonant frequency of this circuit is 8 KHz, corresponding to the data carrier frequency. The negative feedback provided by the tuned circuit is minimum at the resonant frequency resulting in maximum gain of the amplifier at 8 KHz. Conversely, at frequencies removed from 8 KHz, the impedance is lower and the negative feedback for such frequencies increases. The amplifier gain is therefore reduced and noise, spurious signals and crosstalk are proportionately reduced. The Q of the parallel T is adjusted so that the sidebands of the modulation are passed without attenuation and to allow for small variations in tape speed.

The second negative feedback path involves FET $T_1$ which may be a 3N128. The bias of $T_1$ is controlled by rectifying the signal output of amplifier $A_1$ with diode $D_1$. The filter comprising $R_9$ $C_5$ has a time constant of about 1 second so that it responds only to slow variations in the tape player output signal. As the bias on $T_1$ varies with such signal variations, its impedance changes resulting in a change in gain of amplifier $A_1$. Since the feedback is negative, the result is to maintain the signal output of amplifier $A_1$ at a constant amplitude.

Referring to the waveforms in FIG. 12, the waveform at line A will appear at the output of amplifier $A_1$ as shown in FIG. 11, point A. Following amplifier $A_1$, I have provided comparator amplifier $A_2$. The comparator $A_2$ is biased by the RC networks shown to be responsive only to the positive peaks of the high amplitude cycles in each data segment. These peaks are clipped or squared by the action of the comparator. As shown in FIG. 12, the output at point B is shown on line B for a segment containing a ONE and a segment containing a ZERO. The ONE produces a sequence of eight equally spaced 62.5μsec pulses, followed by a 1.5 msec off period, and a ZERO produces a sequence of four equally spaced 62.5μsec pulses followed by a 2 msec off period.

Figure 13:
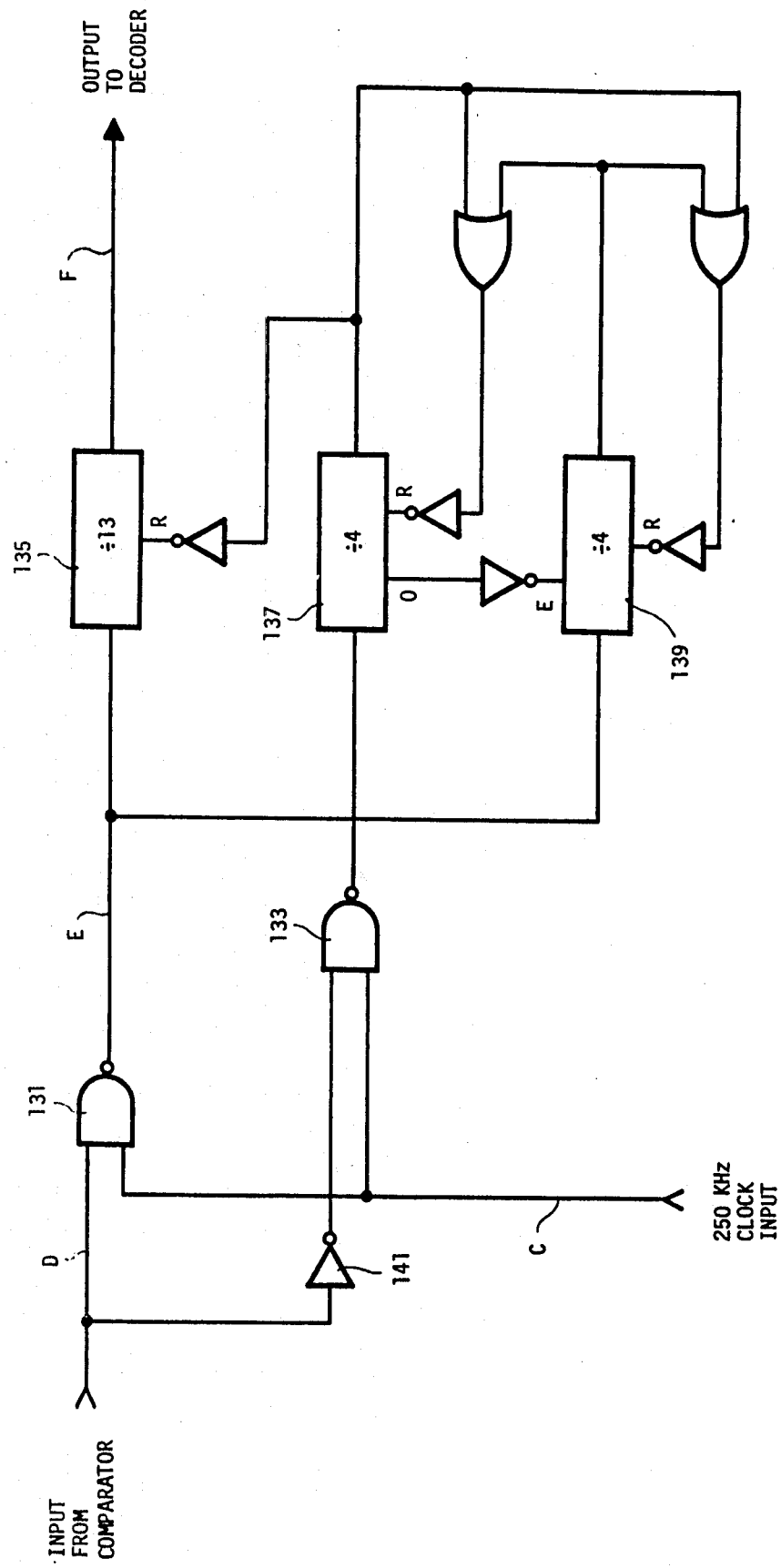
FIG. 13 is a block diagram of the data sampling circuit used in my decoding system.
Figure 14:
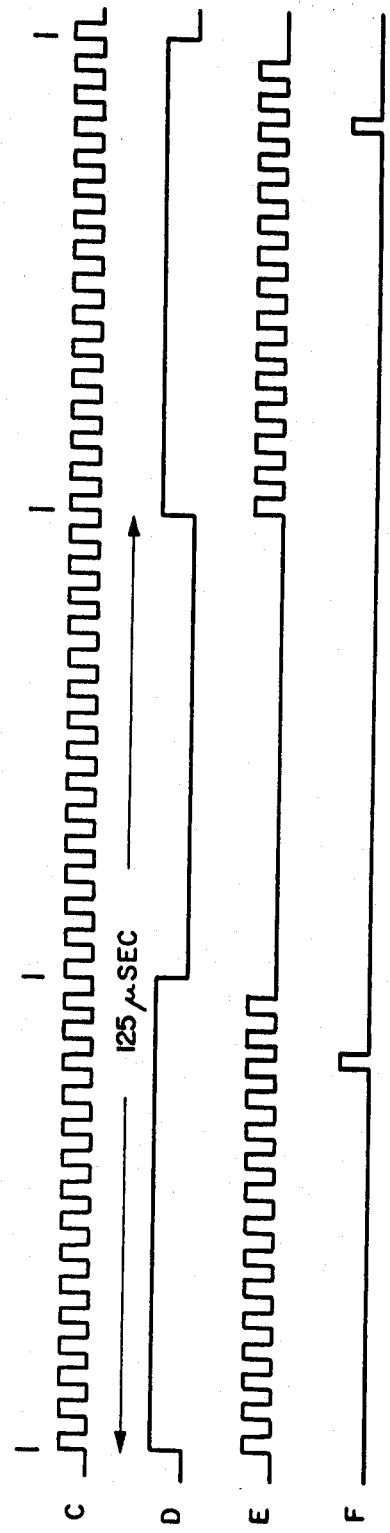
FIG. 14 is a diagram of various waveforms found in the sampling circuit of FIG. 13.

The output of the comparator $A_2$ revealed in FIG. 11 feeds the input of the data sampler shown in FIG. 13. The signal drives one input of AND gate 131 with its other input driven from a 250 KHz clock. This clock may be derived from the internal circuits of the organ when my invention is built into the instrument, or for an add-on application, the clock may be included with my device. Referring to the waveforms of FIG. 14, line C shows the 250 KHz clock signal applied to AND gate 131 and appearing at point C in FIG. 13. The data signal input waveform shown on line D (FIG. 14) when in its high state energizes AND gate 131 passing the clock signal C to counter 135. The input to counter 135 is shown on line E of (FIG. 14). Counter 135 is pre-set to produce an output at point F, at its 13th count as shown on line F.

AND gate 133 receives the 250 KHz ckock signal and the inverse of the data signal on lead D via inverter 141. Thus AND gate 133 produces an output each time a clock pulse coincides with a low signal on lead D to increment counter 137 by one. During each 62.5μsec interval when data line D is low, counter 137 will send a reset pulse to counter 135. Should a positive noise spike coincide with a clock pulse during this interval gate 131 will increment counter 135; but counter 135 will be reset by counter 137 within four clock pulses after the positive noise spike disappears. This protects counter 135 from accumulating erroneous signals during the interpulse interval when the data line is low to ensure the integrity of its operation to detect a subsequent valid data pulse. During the 62.5μsec interval when data D goes high, counter 137 may initially be in a non-zero state. Counter 139 would thus be enabled and would produce a reset pulse to counter 137 after four pulses on lead E. This prevents counter 137 from erroneously resetting counter 135 if several spaced negative noise spikes occur during a valid data pulse. Moreover, if counter 137 is incremented by a negative noise spike after being reset, it will be reset again within four clock intervals after the negative spike disappears. From this it can be seen that counter 135 will produce an output signal only if it accumulates at least thirteen pulses out of a possible fifteen during the 62.5μsec interval when the data line is high, and this will occur unless negative noise pulses occur during three out of six successive clock intervals. It should be apparent that this data sampling circuit provides considerable discrimination against noise pulses which might otherwise adversely affect the operation of the decoding circuitry which follows.

As a result of the sampling action hereinabove described, a clean, noise-free, constant amplitude pulse train output is available at the output of signal conditioner 111, FIG. 9, to drive a binary sequential decoder in accordance with this invention. This pulse train is shown on line F in FIG. 12 and to an expanded scale on line F in FIG. 14. It may be noted that the sampling circuit produces an output pulse at its 13th count. Therefore the length of the data pulse shown on line D, FIG. 14 could be increased due to reduced speed of the tape player 26 and the sampling circuit will still produce its output at the 13th count. It is an advantageous feature of my invention that no specific phase or speed relationship is required between the clock rate and the data carrier frequency.

Figure 15:
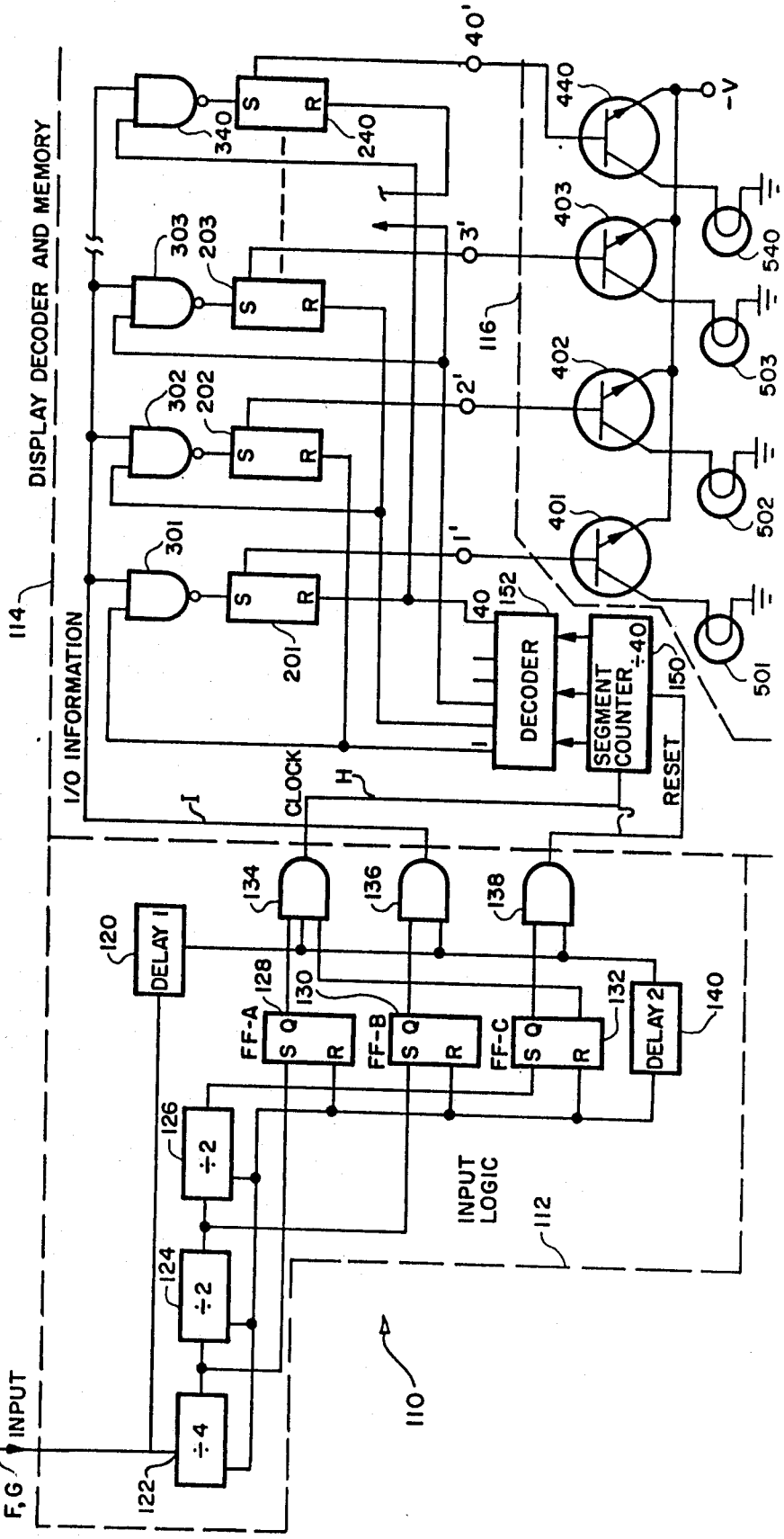
FIG. 15 is a view of the display decoder and memory arrangement utilized in accordance with this invention.

Turning now to FIG. 15, wherein I show a block diagram relating to the preferred decoder utilized in my invention, it will be noted that I have indicated at 110 a binary sequential decoding system utilizing input logic 112 and a display decoder and memory 114. This latter is connected to the display and driver 116, should this basic output capability suffice for a given application. However, various techniques in accordance with this invention for expanding the number of controllable output functions, while maintaining the basic word code frame, will be discussed hereinafter.

Figure 16:
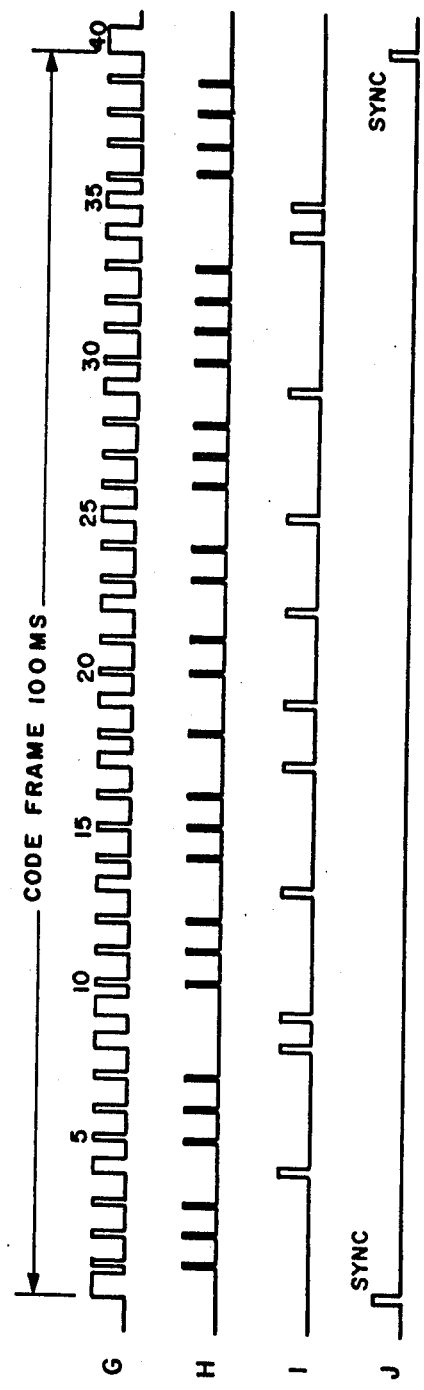
FIG. 16 is a diagram of various waveforms found in the display decoder circuit of FIG. 15.

Referring to waveforms in FIG. 16 to be used in describing the action of decoder 110, line G represents the envelope of the expanded view of the output pulses of FIG. 13 at point F and shown on line F, FIG. 12. The widest envelope shown on line G is for 16 sequential pulses, representative of the sync signal segment, the narrowest envelope is 4 sequential pulses, representative of a ZERO and the medium width envelope is eight sequential pulses, representing a ONE. Each pulse from signal conditioner 111 is delivered to delay 120 and to a divide-by-four device 122 in FIG. 15, with delay 120 for example being a one-shot. The first pulse in each group will energize delay 120 and cause it to generate a single pulse at its output after 2.25 msec. As shown in line H of FIG. 16, 4 sequential pulses produce an output pulse when this particular count results from the input data stream after 2.25 msec. This indicates to the decoder/memory that its corresponding output for this particular word should be a ZERO. Line I of FIG. 16 shows the detection of 8 sequential pulses indicating a ONE output, and line J, FIG. 16, depicts the synchronization pulse accompanying each code frame resulting from the detection of 16 sequential pulses. The method of detection of the three different width sequential pulse envelopes is described in more detail hereinafter.

Since it is possible that my invention will be used in conjunction with a variable speed tape recorder, and in that instance, it is desirable for the delay 120 to be a counter rather than a one-shot the counter input is then keyed to the tape speed, such that the time delay output will always sample the data at the correct or desired time, independent of tape speed. Such counter may be a so-called preset counter so that a prescribed number of cycles will bring about an output.

In decoder 110, data is derived from the sequence of width and amplitude modulated segments of the 8 KHz carrier by noting the number of cycles where positive going amplitudes are above the selected high amplitude threshold level for each segment. The signal conditioner 111 performs this function as described hereinabove, producing pulse sequences such as shown on line F in FIG. 12. Line G, FIG. 16, shows the envelope of a typical sequence of such pulses to detect the number of such pulses in each segment. I provide the divide-by-four device 122, and two divide-by-two devices 124 and 126.

The divide-by-four device 122 provides a pulse out when 4 pulses have been applied, and this device 122 may of course be a dual flip-flop, having the designation MC853P. Thus, when the number of pulses detected reach four, the output of device 122 will set flip-flop 128 (flip-flop A) and is selected to represent a zero, indicative of an OFF condition for the illumination or function means. A typical pulse train at the output of FF128 (point H) is shown on line H of FIG. 16.

Similarly, when eight pulses have been detected, the device 124 will cause the flip-flop 130 (flip-flop B) to be set, and this is to be interpreted to mean that the width of the pulse envelope is sufficient to be considered as a segment representing a ONE, indicative of an ON condition for the illumination means. A typical pulse train at the output of FF 130 (point I) is shown on line I of FIG. 16. If the pulse envelope has sufficient width to be sync a pulse, 8 more pulses will be detected, causing the divide-by-two device 126 to set flip-flop 132 (flip-flop C).

Assuming at this point that all three flip-flops A, B and C of FIG. 5 are in the set position, this is the longest data period involved and constitutes frame sync. Since this period is two milliseconds long, and the delay period is 2.25 milliseconds long, the delay will sample gates 134, 136 and 138 during the off period in all cases. The frame sync signal is used to reset the segment counter 150 to synchronize the decoder outputs with the information on the tape. This signal is shown on line J in FIG. 16.

It is to be observed that 0.25 milliseconds prior to the beginning of any segment, the information in flip-flops A, B and C (128, 130 and 132) is used to drive the display decoder and memory. A pulse from Delay 1, also designated device 120, enables gates 134, 136 and 138 to generate the clock, I/O information, and reset, respectively. An input to Gate 134 being connected to the output of flip-flop 128 causes an output to be given at the end of each data segment, except the output is inhibited during the synchronization segment which furnishes the reset pulse.

As will be apparent, one of the two inputs to gate 136 is connected to flip-flop 130 and generates an output if device 130 is set, and in a like manner, gate 138 generates an output if flip-flop 132 is set. It should be noted that a connection is provided such that the clock output of gate 134 is inhibited if flip-flop 132 is set.

After the data for the past segment has been translated into I/O data and clock, or reset, the output of Delay 1 is further delayed by Delay 2 (device 140) to provide enough time for gates 134, 136 and 138 to react before resetting all flip-flops in the input logic 110.

With continued reference to FIG. 15, it will be noted that the clock output from gate 134 and the reset output from gate 138 are connected to the divide-by-40 counter 150, which serves as a segment counter, with the output from latter device being set to the decoder 152. It will be noted that the segment counter and decoder arrangement contains gates and flip-flops to distribute data to the appropriate output or display device. The decoder serves to decode the divide-by-40 output into 40 equal time segments, with each bit representing a data segment.

It should now be apparent that when flip-flop 132 is set, the output of gate 138 resets the divide-by-40 counter to count No. 1, which is designated as the frame sync interval.

As intended to convey in FIG. 15, 40 wires emanate from the decoder 152, with each wire going positive during its designated time slot. It is important to note that when flip-flop 130 is in the set position, the output of gate 136 serves to drive gates 301, 302, 303 ... 340, with these gates being enabled sequentially by the output of decoder 152.

If an output occurs on one of the gates 301, 302, 303, etc., the associated flip-flop 201, 202, 203, etc. will be set. The output of the decoder 152 is so wired to the flip-flops as to reset them during the segment preceding the period where it may be set. The number 1 output of the decoder 152 will therefore enable gate 301 and reset flip-flop 202. For example, assume a ONE occurs in Segment 3. Flip-flop 203 will be set, causing illumination of lamp 503. Flip-flop 203 will of course remain in the set position until it is reset by decoder 152. The third output from decoder 152 will reset flip-flop 203 during Segment 2 of the next code frame. As may now be seen, the set of flip-flops 201-240 act as a storage buffer, accepting a short pulse indicative of a ONE from the input logic 112 and storing such information for an interval equal to one frame.

The flip-flops 201 through 240 may drive transistors 401, 402, 403 ... 440 respectively via terminals labeled 1' through 40', which in turn may be connected to display elements 501, 502, 503 ... 540. These forty display elements may of course be deployed in or adjacent the keys of the organ, the stop tabs, the bass pedals, or on other musical instruments such as the frets of a stringed instrument. Element 501 can for example be a light, such as a pilot light, that remains illuminated as long as the system is in operation, since this output is used for synchronization.

It is clear that these display elements may be used for other advantageous instructional purposes. For example, a lamp 19 (FIG. 1) can be mounted above the melody keys in a region where the right hand would normally be deployed and designated as a "chord change" indicator. One of the segments is allocated to this function and the ON code is recorded in such segment just prior to a change in chord notes played by the left hand. This lamp alerts the beginning student to glance at his left hand and to be prepared to shift his fingers. A similar voice announcement can be provided simultaneously with the visual indication.

Although the foregoing has involved the outputs of the decoder and memory 114 being used to control display elements, it is to be noted that these outputs may be used to control relays, timing circuits and additional logic circuits as required by particular applications. For example, in an alternative embodiment of this invention, a certain number of the outputs are used to control an expanded number of display elements.

As will now be apparent, at the beginning of each data segment, either 4 or 8 cycles of 8 KHz data will be received, depending upon whether the associated key was pressed during the encoding procedure, with it of course also being apparent that the display device, such as a bulb or light-emitting diode (LED) associated with a given key, stop or pedal may remain on throughout a number of cycles of operation of the aforementioned device, depending of course upon the length of time the associated key was depressed during the time the tape was being recorded.

It should also be clear that the setting of a memory or storage element (201-240) in the ON or ONE condition will cause the display associated with that element to remain energized for a data frame period. Each memory element (201-240) is reset to the OFF or ZERO condition by decoder 152 just prior to the occurrence of the next associated segment and will remain in the OFF condition if such segment contains a ZERO.

Figure 17:
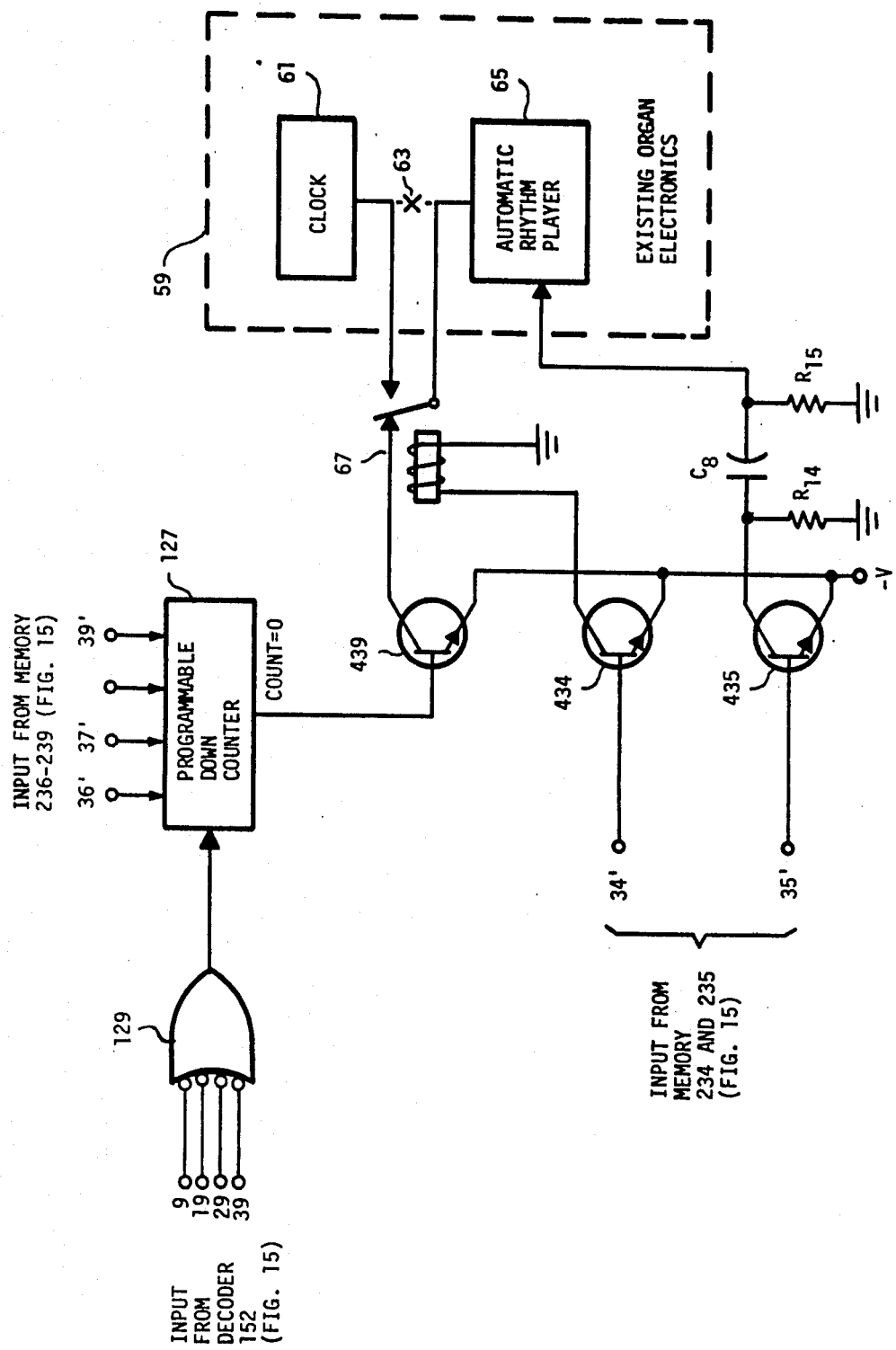
FIG. 17 is a simplified diagram of the circuit used to control an automatic rhythm player contained in an existing organ.

An optional feature of this invention is a means for synchronizing the tempo of an automatic rhythm pattern generator or player with the tempo of the instructional data when the instrument contains such a device. FIG. 17 illustrates an example of such control means. A portion indicative of the electronic section 59 of an organ is shown containing an automatic rhythm player 65 normally controlled by an internal clock 61. In normal use, the rate of clock 61 is adjusted or programmed by the musician by means of controls on the organ/console to produce the particular rhythm and tempo desired. In accordance with this invention, the clock input connection to the rhythm player 65 is broken as at point 63, and the leads connected externally to the contacts of relay 67 as shown. When relay 67 is not energized, the back contacts are closed and normal organ operation is maintained. However, when it is desired to utilize the rhythm player in conjunction with an instructional tape, appropriate control signals are prerecorded on the tape. For example, in FIG. 17, a continuous ONE is recorded in the code segment controlling transistor driver 434 (see also FIG. 15). In this embodiment, driver 434 is connected to coil of relay 67 rather than a lamp 534. In response to the continuous ONE condition of this segment, relay 67 closes, transferring the clock input of rhythm player 65 to driver 439. Driver 439 utilizes the input impedance of the automatic rhythm player 65 as a load instead of a lamp 539.

In order to provide a wide range of rhythm speeds up to 40 Hz, a 40 Hz clock is derived by combining four evenly spaced pulses occuring in one data frame. For example, in FIG. 15, it may be noted that pulses occur continuously from outputs 1 through 40 of decoder 152 since these are used to enable gates 301 through 340. Advantageously, additional connections are made to outputs 9, 19, 29, and 39 from decoder 152. These outputs represent the inputs to OR gate 129 of FIG. 17, thereby producing a 40 Hz clock signal at its output, since a pulse occurs each 25 msec. To control the rate at which the rhythm player is operated, a programmable down counter 127 is utilized which may be a type 74191. The 40 Hz signal is connected to the clock input of counter 127. The counter is controlled by a 4-bit binary word derived by four inputs from four segments in a data frame. In the example shown, segments 36 through 39 have been allocated for this purpose. Therefore, the binary word input for counter 127 is taken from outputs 36' through 39' from display decoder and memory 114, FIG. 15. Since the 4-bit word can define 16 levels, the 40 Hz clock input to counter 127 can be divided by any number from 0 to 15, thereby providing a wide range of rhythm tempos, suitable for almost any requirement.

The controlled output of the counter 127 drives transistor switch 439 in FIG. 17 to supply the clock pulse to automatic rhythm player 65 via the closed contacts of relay 67. In order to ensure proper synchronization of rhythm player 65 to the instructional material on the tape, a reset pulse is provided. The reset pulse is controlled by a signal recorded in segment 35 with decoder and memory 114 output 35' driving transistor 435. The leading edge of a pulse from input 35' is differentiated in the network comprising $R_{14}$, $C_8$, and R15 and applied to the proper point of the existing organ automatic rhythm player 65. This feature of this invention ensures that, should the tape player be stopped during playing of a tape and then restarted, the proper "up-beat" and "down-beat" and rhythm pattern relationships are maintained.

Rhythm sounds, as used on most automatic rhythm players, comprise a series of segments or rhythm patterns repeated continuously. Each pattern may use say 12 or 16 clock pulses to progress from beginning to end. The reset function insures that clock beat No. 1 of the rhythm player segment is perfectly synchronized with clock beat No. 1 as prerecorded on the instructional tape. Loss of sync would cause the rhythm pattern to sound off beat or confusing, depending on the degree of sync loss.

In the exemplary version of my invention described in detail hereinabove, it may be noted that there is a limit of 39 functions for each data frame. In some applications such as an electronic organ with automatic chord buttons and rhythm player, it is often desirable to be able to increase the number of functions to broaden the scope of the instructional material. It is obvious that this objective could be realized by lengthening the data frame and adding time slots or by shortening the time slots in the present frame. Neither of these approaches is desirable. Any major increase in the frame length will result in excessive delay between successive time slots for individual notes and operations thereby limiting the speed of operation. Shortening the time slot and maintaining the desired coding structure would require an increase in the audio carrier frequency and the necessity of a more expensive tape recorder and tape player to handle the higher frequencies. This, of course, would negate the objective of a low cost unit.

Figure 18:
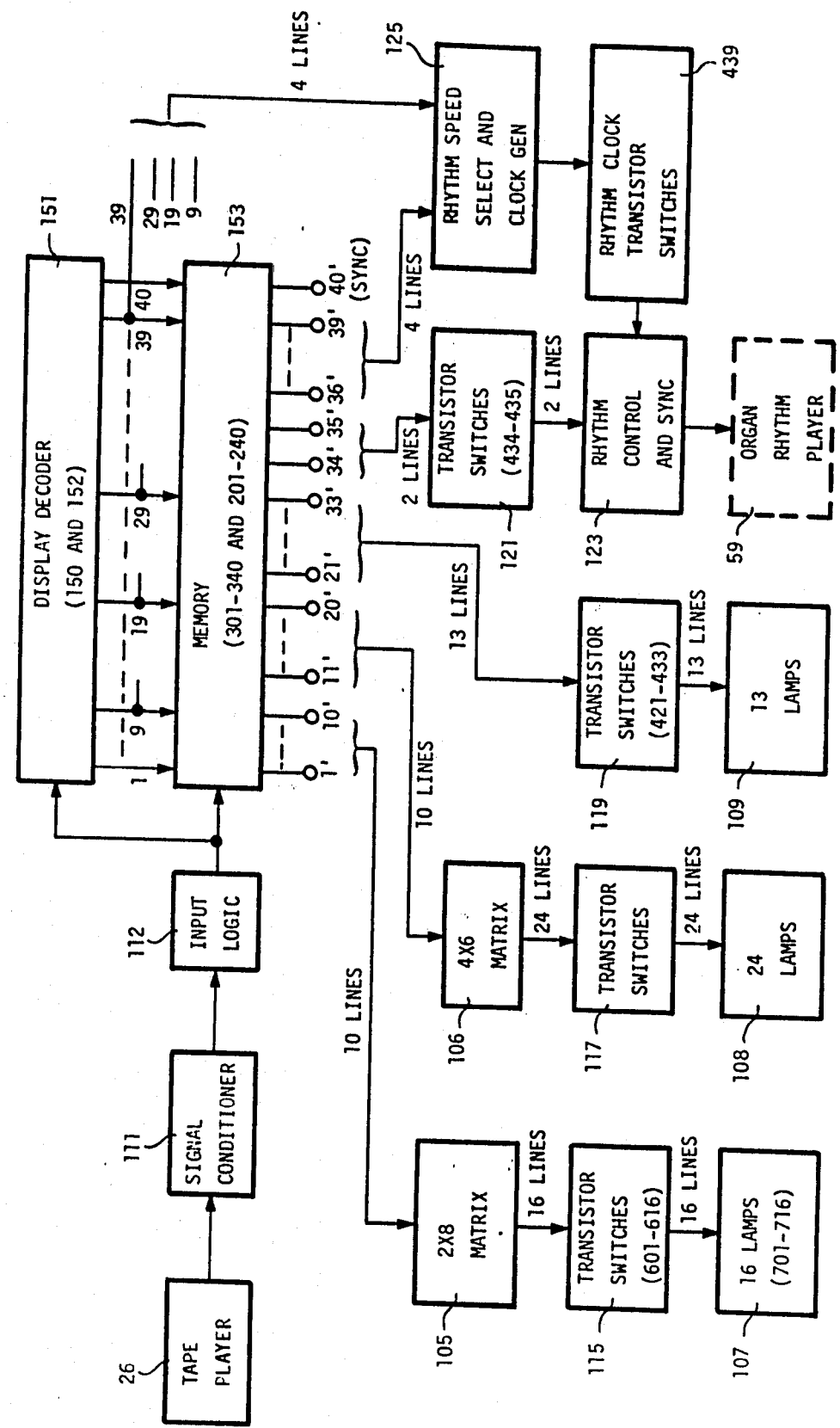
FIG. 18 is a block diagram of an alternative implementation of my invention that provides a greater number of functions than number of segments in a data frame.

Therefore, in an important alternative implementation of this invention, a unique two-bit secondary coding method is provided, that can significantly increase the number of control functions with essentially the same frame length and structure. FIG. 18 is a simplified block diagram of this aspect of the present invention. As depicted in this figure, tape player 26 is arranged to play a pre-recorded tape containing, in accordance with this invention, aural instructional information and programmed player instructional data for illuminating key lamps and controlling other functions. The data includes a special secondary coding as mentioned above. Input logic 112 driven by signal conditioner 111, display decoder 151 and memory 153 decode the data signals as previously described. The display decoder 151 consists of counter 150 and decoder 152. Memory output from display decoder 151 consists of 39 lines associated with flip-flops 201 through 240 (FIG. 15). Each line is energized when a ONE was present in the data time slot associated with that line, and de-energized when a ZERO was present.

Line 1' through 10' from memory 153 of FIG. 18 drive the 2 × 8 matrix 105. Combinations of ONE'S on the set of two and eight inputs to the matrix respectively can generate 16 different outputs, although not all outputs can be used simultaneously as will be described hereinafter. The 16 output lines from matrix 105 control a set of transistor switches 115. These switches are shown in detail in FIG. 19 as switches 601 through 616, and are also depicted in FIG. 20 as blocks 600 and 617. FIG. 18 reveals that switches 115 control 16 lamps 107, latter being shown in FIG. 19 as lamps 701 through 716. In accordance with this invention, these lamps may illuminate keys to be played, or provide other functions for instructional purposes. Use of these lamps to illuminate keys is revealed in FIG. 20.

Returning to FIG. 18, 4 × 6 matrix 106 is similarly driven by 10 lines from memory 153 outputs 11' through 20'. The 24 outputs from matrix 106 control a set of 24 transistor switches 117 that drive a set of 24 lamps 108.

Lines 21' through 33' from memory 153 are connected to a set of 13 transistor switches 119 that control a set of 13 lamps 109. It should be observed that switches 119 of FIG. 18 would be indicated in FIG. 15 as transistors 421 through 437, and lamps 109 of FIG. 18 would be indicated in FIG. 15 as lamps 521 through 539. It is significant to note that a total of 53 lamps can be controlled from 33 outputs of decoder 114.

Outputs 34' and 35' from memory 153 of FIG. 18 control transistor switches 121. These switches are transistors 434 and 435 shown in FIG. 17 and used to control the automatic rhythm player 65 as described in detail hereinabove. Similarly outputs 36' through 39' of memory 153 control the rhythm speed select and clock generator 125 output. It may also be noted in FIG. 18 that the rhythm clock is derived from the pulse trains from decoder 151 outputs 9, 19, 29 and 39 as previously described. Output 40' from memory 153 will have an output signal as long as decoder sync is being maintained. If desired, this output can be used to control a pilot lamp or other display (not shown) to indicate that the instructional device is in operation. It should be noted that a positive signal must be present on line 34' to control rhythm player 59. If the tape player is turned off, the player 59 will automatically revert to its internal clock by opening of relay 67' see FIG. 17.

Figure 19:
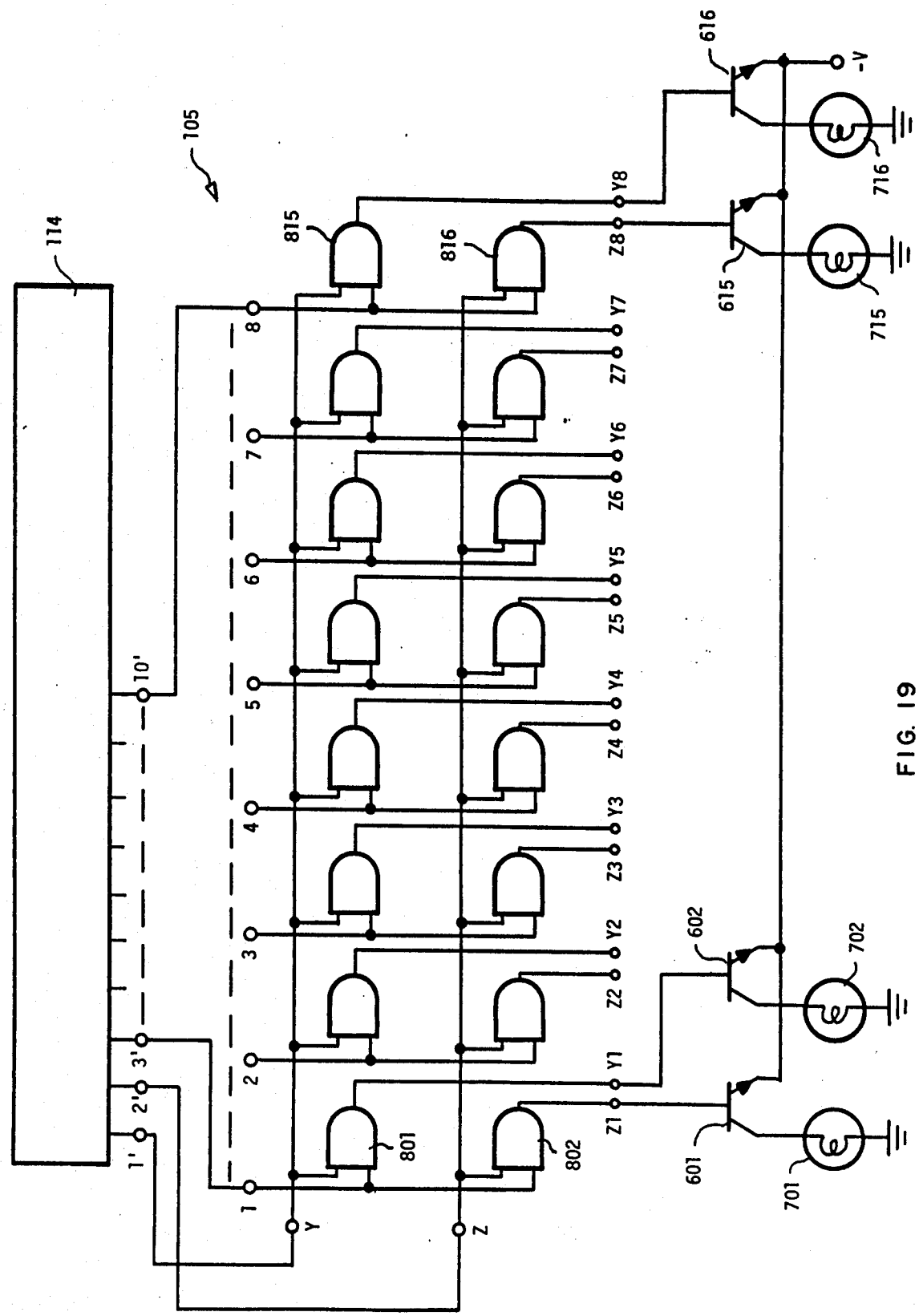
FIG. 19 is a diagram of a 2×8 matrix utilized to respond to my unique secondary code signals.
Figure 20:
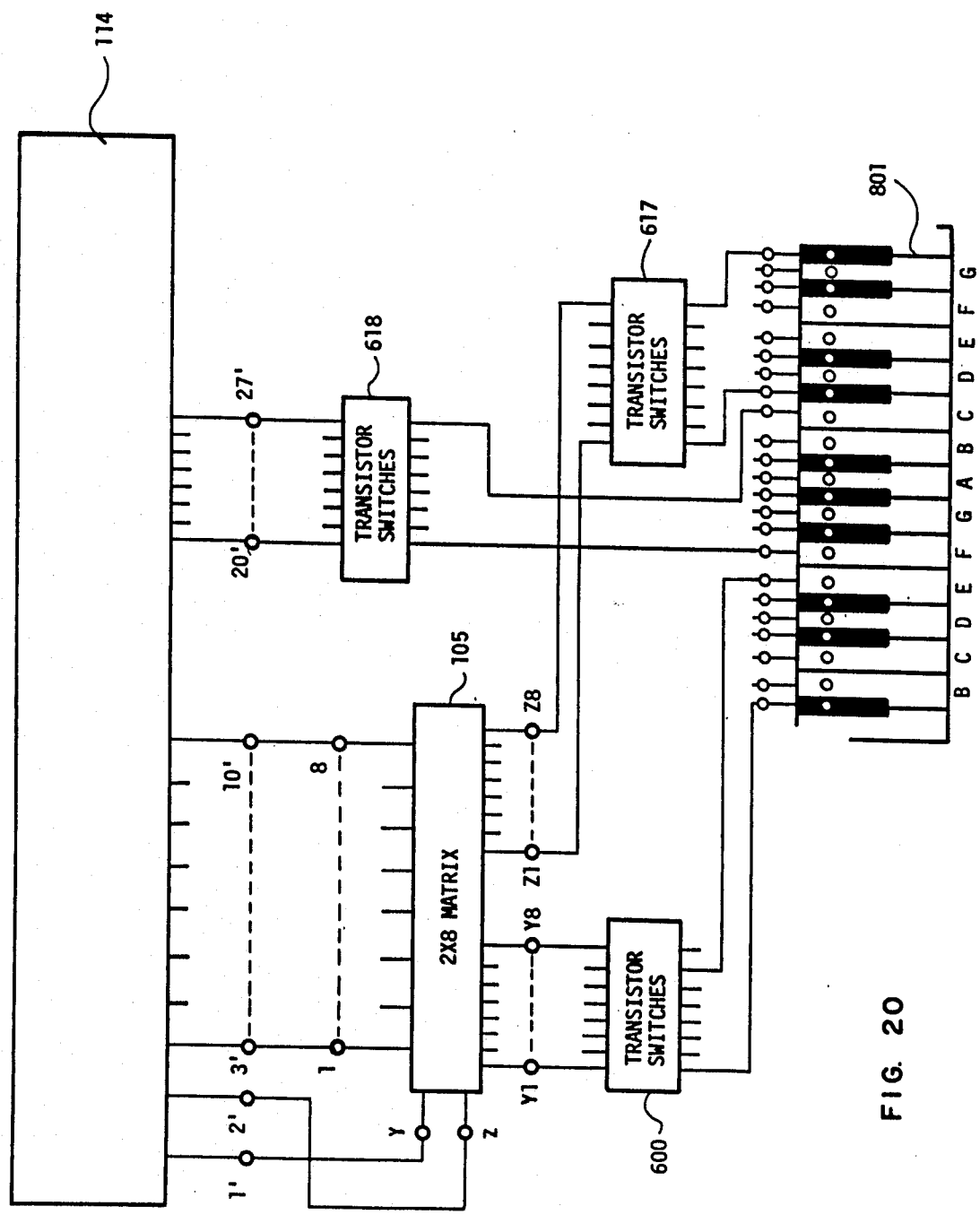
FIG. 20 is a representation of a typical keyboard having illumination means controlled by a decoder and a matrix.

Certain facets of the operation of matrices 105 and 106 and certain limitations on such operation may be more fully appreciated by referring to FIG. 19. 2 × 8 matrix 105 is illustrated in detail in this figure, and is revealed to consist of matrix inputs Y and Z connected respectively to lines 1' and 2' from decoder 114, and matrix inputs 1 through 8 connected respectively to lines 3' through 10' from the decoder. The intersections of the matrix thus formed consists of 16 AND gates 801 through 816, which gates may be type SN 7400. The outputs of gates 801 through 816 are output lines Z1 through Z8, and lines Y1 through Y8 as shown in the figure.

As an example of operation, consider a ONE output on line 1' from decoder 114 of FIG. 19. This line connected to input Y of matrix 105 energizes the top matrix line. Now consider a ONE occurring on line 3' from decoder 114 connected to input 1 of matrix 105. The signal on input line Y and input line 1 energizes AND gate 801 causing an output on output line Y1. This line is connected to the base of switch transistor 602, causing it to conduct, thereby illuminating lamp 702. It may now be seen that a ONE appearing on any of the decoder 114 output lines 3' through 10' will cause outputs on the respective Y- output lines when a ONE is present on input line Y and outputs on the respective Z- output lines when a ONE is present on input line Z. It should thus be clear that any one of lamps 701 through 716 can be selectively illuminated.

A limitation of the use of matrix 105 can now be noted. During any one code frame inputs are allowed to either the Y input or the Z input but not both. If both Y and Z input lines were allowed to be energized during the same frame, the matrix could not distinguish an input to the 1 through 8 input lines as being associated with the Y or the Z line. This limitation causes no problem, as will be delineated hereinafter. While I have explained only the operation of 2 × 8 matrix 105, it is to be understood that 4 × 6 matrix 106 operates in a like fashion with the same limitation that only one of the four input lines (identified as the A, B, C, and D inputs) can be energized during any one code frame.

Turning to FIG. 20, I have shown a typical arrangement for illuminating the key lamps for a right-hand manual on an organ or piano using both direct and matrixed outputs from decoder 114. Outputs 20' through 27' from decoder 114 drive a set of transistor switches 618. The switches 618 are connected to lamps mounted within keys F through C in keyboard 801. Since these key lamps are driven directly from decoder 114, any desired combination of these keys can be illuminated during a code frame. Note however that key lamps for keys A # through E to the left of the F through C group are driven by the Y1 through Y7 outputs from matrix 105, and key lamps for keys C # through G # to the right are driven by the Z1 through Z8 outputs of matrix 105. The limitation of the matrix permits combinations of either the Y group or the Z group but not both to be illuminated during one code frame. As stated hereinabove, this limitation causes no problems since the keyboard 801 shown is to be played with one hand only and the span from the keys associated with the Y group to the keys associated with the Z group exceeds the reach of an average person. Therefore, there is no need for simultaneous illumination of keys in the two groups. Moreover, this situation is typically taken into consideration during the encoding process, and erroneous illumination due to output matrixing is eliminated at the source (i.e. the tape)

Table I, set forth hereinafter, shows a typical assignment of codes for application of my invention to an electronic organ having a set of chord buttons and an automatic rhythm device. The DECODER OUTPUT column shows the outputs that require a ONE to energize the indicated function. Note that all functions involving a matrix require a ONE in two of the decoder outputs while the direct or dedicated decoder outputs utilize only one of such outputs per function. In this example, the C and D inputs of 4 × 6 matrix 106 are not needed.

While I have shown a typical coding pattern in Table I, it is to be understood that I am not to be limited to this arrangement. Alternative arrangements include illumination of other keyboard manuals, different size matrices and variation in the

TABLE I

| FUNCTION | MATRIX OUTPUT | DECODER OUTPUT |
|---|---|---|
| CHORD LAMPS: | | |
| D | A3 | 1' - 7' |
| D# | A4 | 1' - 8' |
| E | A5 | 1' - 9' |
| F | A6 | 1' - 10' |
| F# | A1 | 1' - 5' |
| G | A2 | 1' - 6' |
| G# | | 30' |
| A | | 31' |
| A# | | 32' |
| B | | 33' |
| C | B5 | 2' - 9' |
| C# | B6 | 2' - 10' |
| D | B1 | 2' - 5' |
| D# | B2 | 2' - 6' |
| E | B3 | 2' - 7' |
| F | B4 | 2' - 8' |
| KEYBOARD LAMPS: | | |
| A# | Y2 | 11' - 14' |
| B | Y3 | 11' - 15' |
| C | Y4 | 11' - 16' |
| C# | Y5 | 11' - 17' |
| D | Y6 | 11' - 18' |
| D# | Y7 | 11' - 19' |
| E | Y8 | 11' - 20' |
| F | | 21' |
| F# | | 22' |
| G | | 23' |
| G# | | 24' |
| A | | 25' |
| A# | | 26' |
| B | | 27' |
| C | | 28' |
| C# | Z1 | 12' - 13' |
| D | Z2 | 12' - 14' |
| D# | Z3 | 12' - 15' |
| E | Z4 | 12' - 16' |
| F | Z5 | 12' - 17' |
| F# | Z6 | 12' - 18' |
| G | Z7 | 12' - 19' |
| A | Z8 | 12' - 20' |
| CHORD CHANGE LAMP | | 29' |
| RHYTHM SWITCH CONTROL | | 34' |
| RHYTHM RESET | | 35' |
| RHYTHM SPEED CONTROL BINARY CODE WORD | | 36', 37', 38', 39' |
| DATA FRAME SYNC | | 40' | number of dedicated lines and the number of matrixed lines. For example, a special application of my invention to be discussed in more detail hereinafter, required a code frame containing 43 segment. To achieve this increase the code frame duration was increased to 107.5 msec. The purpose of this variation was to provide additional chord button lamps. For example lower C and C # and upper F # and G were added in this version.

Figure 21:
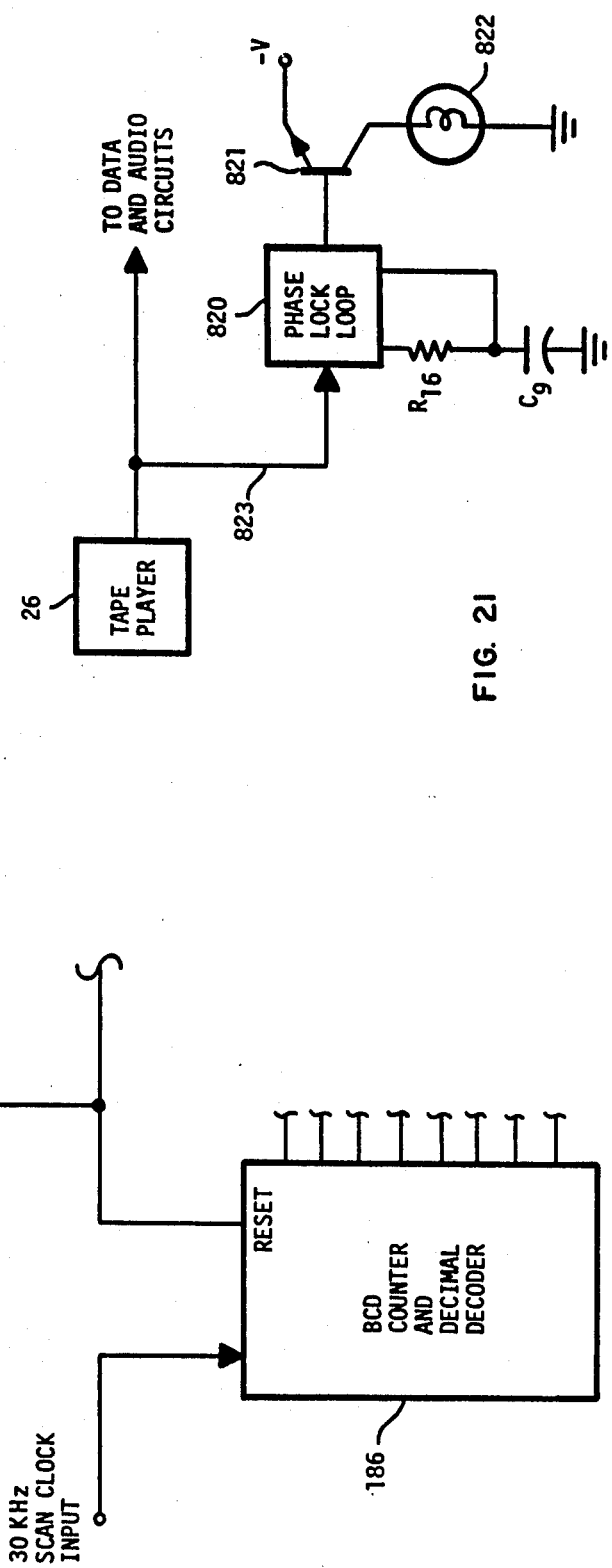
FIG. 21 is a diagram of an indicator circuit to show when tape player tape speed is normal.

Turning now to FIG. 21, I show a block diagram of my indicator lamp circuit that indicates when tape player 26 is operating at its normal speed. Phase lock loop (PLL) 820, which may be an NE 567 utilizes $R_{16}C_9$ as a frequency reference. PLL 820 has a positive output when the signal on input line 823 has a frequency equal to $1/R_{16}C_9$. This positive output energizes transistor switch 821, lighting indicator lamp 822. Tape player 26 in accordance with a preferred embodiment of my invention plays prerecorded tapes having the data recorded thereon in the form of a width and amplitude modulated audio carrier. A frequency of 8 KHz is a preferred frequency for this carrier. When tape player 26 is operating at the exact speed for which the tape was recorded, the carrier output will therefore be 8 KHz. For this case $R_{16}C_9$ are selected to provide an 8 KHz resonant circuit as a reference for PLL 820. Therefore, when an adjustable tape player 26 is in use, the speed can be varied until the lamp turns on thus indicating the desired speed of the tape player.

As will now be apparent, I have provided a novel means for effectively teaching the playing of a keyboard instrument, utilizing selectively operated illumination means within the keys of the keyboard, with the arrangement being such that by suitably pressing or striking the indicated keys, the player can cause certain notes to be sounded. These notes can include individual tones as well as chords composed of several tones. By simultaneously pressing for example 3 or 4 keys of a musical chord in response to the lighting of the respective illumination means, the chord will be played during the time the keys are depressed. The manner in which the bass pedals of an organ are to be played can also be indicated by lights. Similarly, for organs equipped with chord button boxes, such buttons can be illuminated to direct the playing thereof.

Due to the flexibility and speed of the binary sequential decoding system taught herein, which of course receives intelligence from a pre-recorded tape, I am able to provide many pleasing and educational capabilities to any ordinary electronic organ. Tapes can be selected such that the beginning musician can gradually move from the simple melodies, to playing complicated numbers involving the use of both hands as well as the feet.

Furthermore, in instruments having an automatic rhythm player provided in accordance with this invention, the rhythm player can be caused to be played in a rhythmic fashion in synchronism with the manual playing in response to data placed upon the tape.

Data may be placed on tapes such that illumination means can be caused to light individually, or in groups of any practical number, thus making it possible for the player, by following the illuminated incandescent or neon bulbs, or light emitting diodes, to play a melody with which suitable chords are properly interposed. The potential of my novel binary sequential decoding system is such that a very large number of functions can be simultaneously activated without exceeding the capability of my device. Such functions can of course include in addition to the lighting of the melody keys with the appropriate chords, the illumination of the stop tabs and switches to be manipulated by the organist and the control of the novel chord change indicating lamp to alert a beginner when a change in chord keys is imminent. Further, the operation of bass pedals coupled with the automatic provision of rhythm amounts to an arrangement designed to give pleasure and delight to almost any member of the family.

While I have hereinabove described an instructional device that is adaptable to various instruments such as organs, pianos, and the like, which is, by design and in accordance with my invention capable of implementation with low cost components, I will now describe an alternative implementation especially adapted to electronic organs that offers an even lower cost in large scale production. As previously described, the digital nature of the decoder and logic circuits in my invention permits the use of many readily available and low cost integrated circuits. Where high volume production is planned, the cost could be reduced even further by using MOS type LSI circuits. Therefore, my alternative implementation has been especially tailored to allow all of the logic circuits to be included in a single LSI chip package with the exception of the lamp transistor switches. Additionally, I have reduced the number of lamp switch transistors from 56 or more to 15, further reducing the cost.

One problem inherent in adapting my invention to implementation with a single LSI package is the limited number of terminals on such packages, a limit of about 40 being currently available. Where 56 or more lamps and 10 or more other external connections are required, this limit is, of course, exceeded. To this end, I have provided a multiplexing method for driving 56 lamps that requires only 15 output terminals, thereby allowing all of the digital circuitry to be implemented in a single MOS LSI packaging.

Therefore, this alternative implementation has been designed to perform the same functions as my first implementation, yet requires only 15 output terminals. The logic elements used to accomplish this end result can be implemented in an MOS LSI package. In order to explain the operation of my unique technique for reducing the required number of output terminals, I will refer to circuit arrangements using MOS IC elements, that is, I will use as building blocks, integrated circuits that are available and indentified by industry type numbers. Those skilled in the art will fully understand the functions and operations of such integrated circuits from such type numbers. It is to be understood of course that in a commercial implementation of this alternative version of my invention, a single LSI package would be designed by incorporating the functional circuit types described herein, into a single LSI package.

Figure 22:
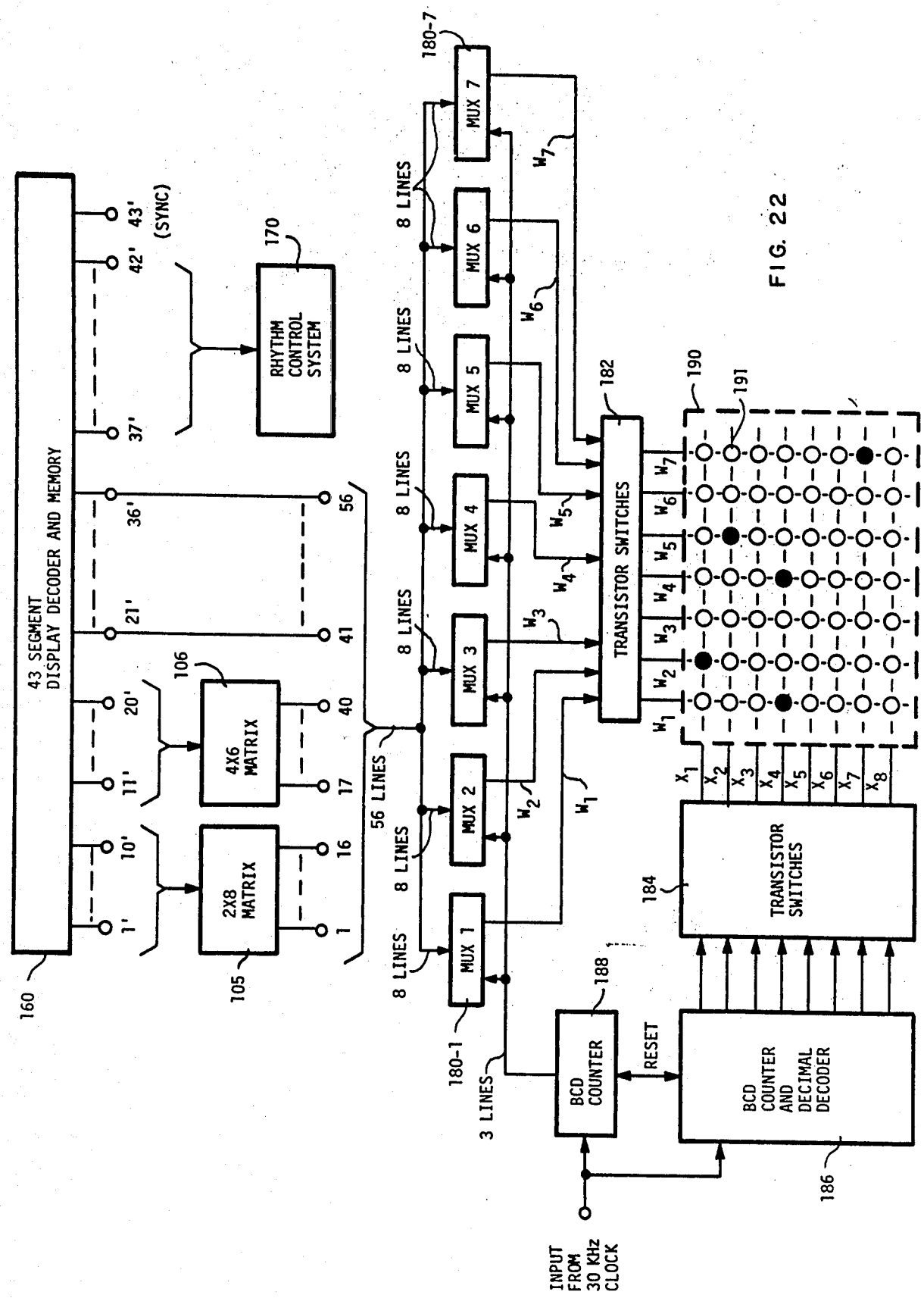
FIG. 22 is a block diagram of an alternative implementation of my invention that reduces the number of control lines to the signal lamps and which allows the electronics portion to be contained in a single MOS LSI package.

FIG. 22 presents a block diagram of the decoder and lamp control circuits in accordance with this version of my invention. As mentioned hereinabove, I have used a data frame containing 43 data segments. The display decoder and memory 160 therefore has 43 outputs 1' through 43'. Outputs 1' through 36' are utilized for control of display lamps; 37' through 42' are utilized for operation of automatic rhythm control system 170 in the same manner as previously described, and output 43' is the frame sync output. Decoder 160 outputs 1' through 10' drive 2 × 8 matrix 105 having control outputs 1 through 16' outputs 11' through 20' drive 4 × 6 matrix 106 having control outputs 17 through 40; and outputs 21' through 36' represent control lines 41 through 56. Thus, outputs 1 through 56 are available for the control of 56 lamps.

The 56 lamps are connected in an array 190 of 8 rows in 7 columns with a lamp at each intersection, as at 191. The inputs to the colums are identified as $W_1$ through $W_7$ and the inputs to the rows are identified as $X_1$ through $X_8$. The address of each lamp is its row and column number such as $W_7X_2$ for lamp 191. A group of 7 multiplexers 180-1 through 180-7 which may be type 74151's are utilized with each associated with array 190 W- input ($W_1$ through $W_7$ respectively). Each multiplexer 180 accepts 8 control data word inputs. For example, multiplexer 180-1 is driven by data word lines 1 through 8, multiplexer 180-2 is driven by data word lines 9 through 16 and so on through data word line 56. The output lines of multiplexers 180-1 through 180-7 are connected to each of their respective 8 inputs sequentially by BCD counter 188, as described in more detail hereinafter. Counter 188 may be a type 74161. When an output occurs on a "W" line, an associated transistor switch in switch group 182 connects a source of voltage to the corresponding array 190 W input. For a lamp in array 190 to be illuminated it is necessary for such a voltage to be applied to its W address and in addition for a ground to be applied to its "X" address.

With continued reference to FIG. 22, it should be noted that in order to supply the ground at the correct time, I utilize BCD counter and decimal decoder 186 having 8 outputs. Counter 186 may be a type 74142. Each output line of counter 186 drives a transistor switch in switch group 184. The transistor switches 184 serve to ground the inputs $X_1$ through $X_8$. In operation, both BCD counter 188, and BCD counter and decimal decoder 186 are cycled by a 30 KHz scanning clock input. The data segments are chosen to have a length of about 2.66 msec, therefore there will be eight cycles of the scan clock per segment.

The decoder 186 in response to the scanning clock therefore scans the 8 X inputs sequentially once per code segment. Simultaneously, the scan clock is counted by BCD counter 188 having three outputs providing eight binary codes. Counter 188 therefore counts from one through eight in coincidence with the scanning of the eight X inputs to array 190. The counts from counter 188 control the seven multiplexers 180 in parallel. The coding used during recording of the tape is chosen to match the desired W-X combination such that the time that a ground is on the selected X input to array 190, the counter 188 count distributes the control signal to the selected W input, thereby illuminating the selected lamp. As may be noted, a selected lamp will be on for one-eighth of segment or for a 12.5 percent duty cycle. When a specific lamp is maintained illuminated for several sequential data frames, this duty cycle causes the lamp to appear to be on continuously.

The lamps shown in array 190, FIG. 22, have several lamps shown as solid circles. This is an example to illustrate the conditions when an input appears on columns $W_1$, $W_2$, $W_4$, $W_5$, $W_7$ during a data frame and at the time the scanning input energizer row inputs $X_4$, $X_1$, $X_4$, $X_5$ and $X_7$ respectively. This example is explained in more detail hereinafter with reference to FIG. 23 wherein the same lamps are shown illuminated for illustrative purposes.

In order to make certain that the two counters (188 and 186) are synchronized, a common reset line is used.

Figure 23:
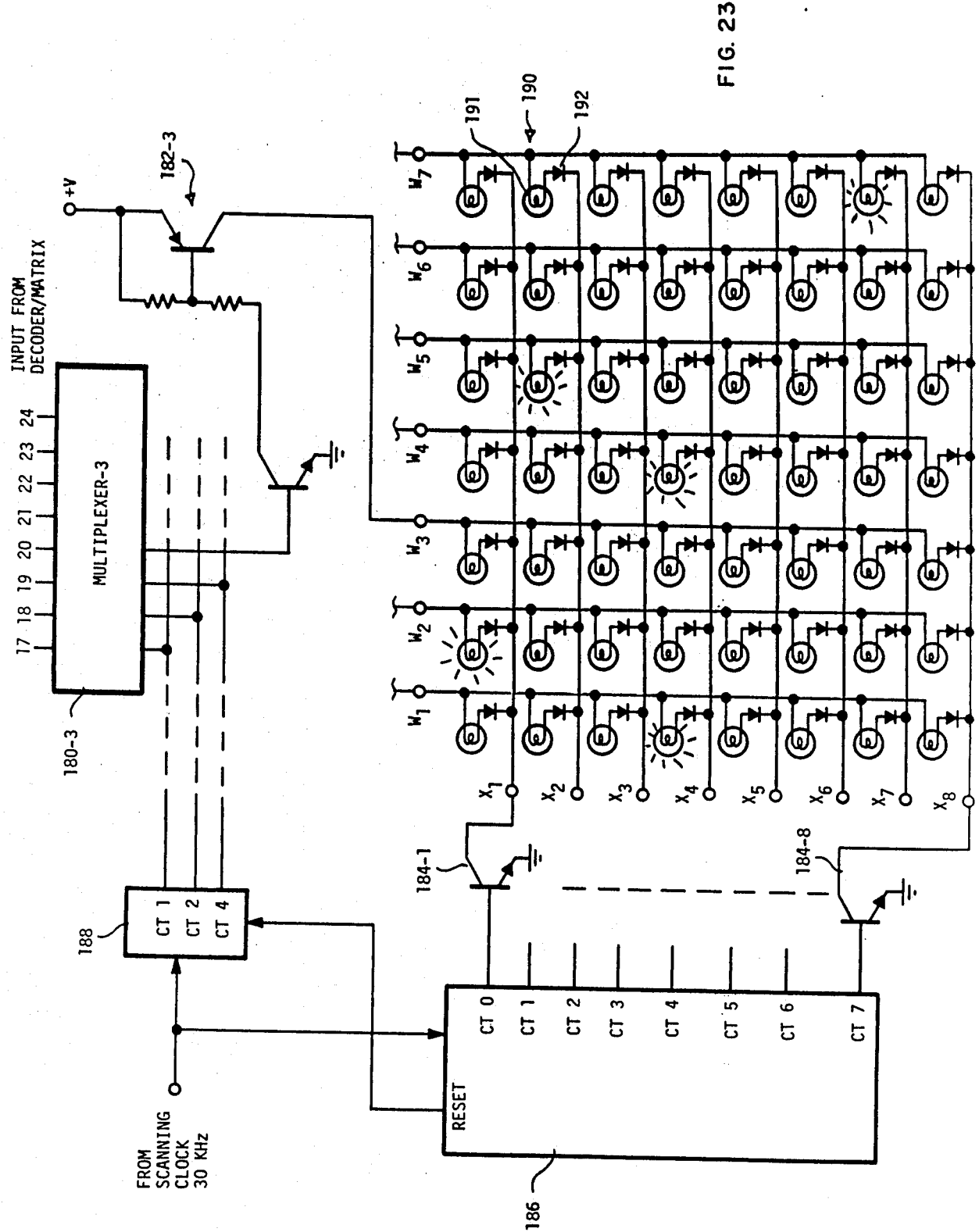
FIG. 23 is a detailed view of the lamp array and lamp control circuits shown in block diagram form in FIG. 22.

Turning now to FIG. 23, the operation of the multiplexers 180, counters 186 and 188, and array 190 will be explained in more detail. For simplicity, only multiplexer 3 (180-3) is shown with its associated transistor switch 182-3 driving input $W_3$. Similarly, transistor switches 184-1 through 184-8 are controlled by counter 186 outputs CT0 through CT7 respectively. Multiplexer 3 (180-3) as well as the remainder of the multiplexers are scanned by the binary code outputs CT1, CT2, and CT4 from BCD counter 188.

Figure 24:
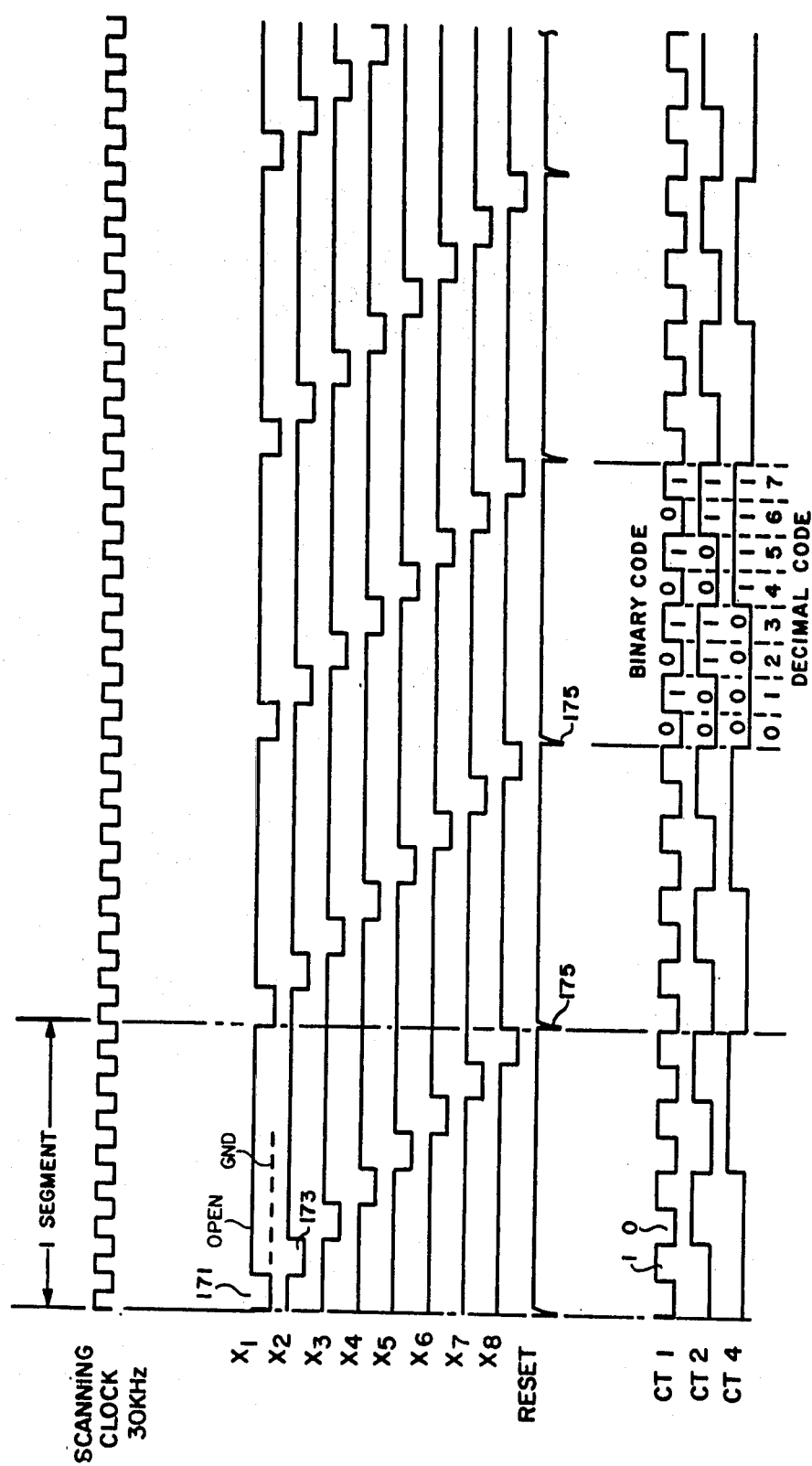
FIG. 24 illustrates various counter waveforms used to control the lamp array.

The operation of the counters is more easily understood by reference to the waveforms of FIG. 24. The scanning clock 30 KHz pulse train shown operates counters 186 and 188. As shown on line $X_1$, for example, counter 186 causes array input $X_1$ to be grounded for one-eighth of a segment, pulse 171. When the next clock pulse occurs, the counter 186 steps one count to ground input $X_2$ for the next one-eighth segment (pulse 173) and so on until each of the eight X inputs have been grounded in sequence. At the end of the eighth grounding pulse at $X_8$, a reset impulse 175 shown on the RESET line is generated by counter 186, resetting both counter 186 and counter 188, thereby ensuring the required synchronization.

The binary codes for scanning of the multiplexers 180 are shown on line CT-1, CT-2 and CT-4 and appear at the like numbered outputs of counter 188. The 8 binary codes and their corresponding decimal numbers are shown in FIG. 24.

Figure 25:
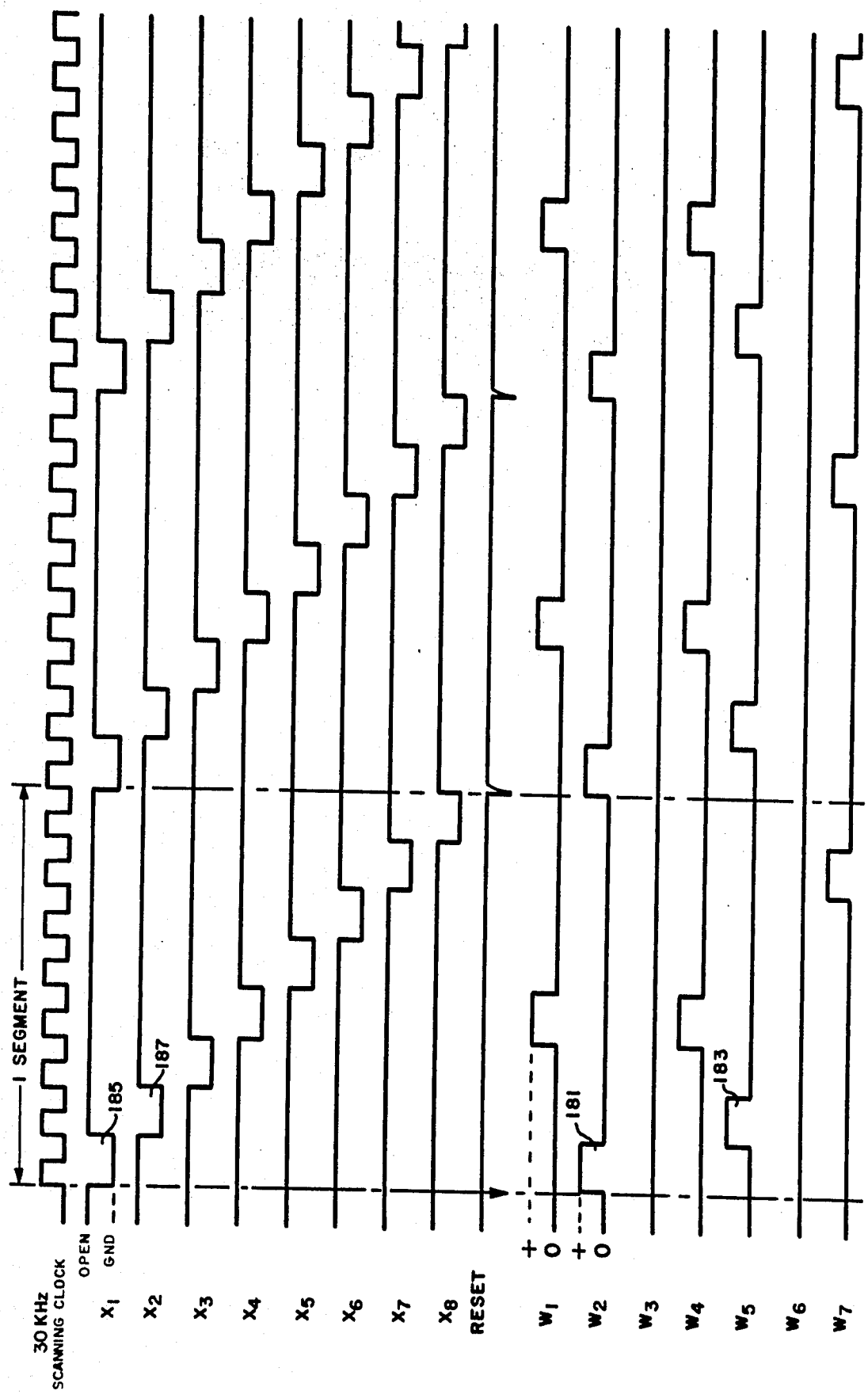
FIG. 25 illustrates an exemplary set of lamp control pulses used to explain how the array lamps are selectively illuminated.

In FIG. 25, an example of a set of outputs from multiplexers 180 is illustrated along with the scanning signals for the X inputs in order to illustrate operation of a specific group of lamps. As shown, a ONE has been detected in code segment 9, appears at input 1 of multiplexer 180-2, and is read out by binary code 0-0-0 from counter 188. A positive voltage pulse 181 appears at array input $W_2$ (FIG. 23) and shows on line $W_2$, FIG. 25. Since array input $X_1$ is grounded at this time, by pulse 185, lamp $W_2X_1$ is illuminated as indicated schematically in FIG. 23. The next lamp to be energized may be seen to be $W_5X_2$ due to grounding pulse 187 and voltage pulse 183. Since a positive voltage pulse 183 has appeared on input $W_5$, a ONE was detected in segment 34 and appeared on input 2 of multiplexer 180-5. The binary code 1-0-0 from counter 188 reads this signal to the output line of multiplexer 180-5. In a similar fashion, lamps will be turned on in the following sequence: $W_1X_4$ and $W_4X_4$ simultaneously; then $W_7X_7$. As shown in FIG. 25, the above group of lamps ($W_2X_1$, $W_5$, $X_2$, $W_4X_4$, $W_4X_4$, $W_7X_7$) is repeated for three successive data frames.

Each lamp 191 utilizes a diode 192 in series to protect against leakage paths.

While I have shown the lamps in the form of a rectangular array 190, it is clear that physically the lamps are each located in the appropriate keys or other desired indicator locations.

A desirable feature of my invention is that all of the lamps be extinguished when the tape player is stopped or is in its rewind mode. As may be noted from FIG. 15, it is possible for some of the memory flip-flops 201-240 to remain in the set or ON condition when the tape is stopped.

Figure 26:
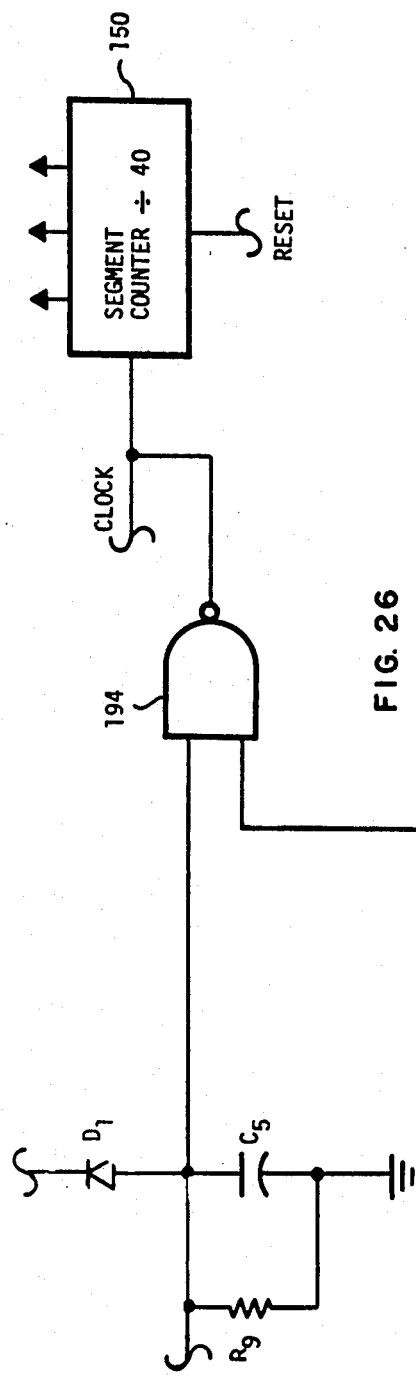
FIG. 26 is a block diagram of a tape motion detector provided to turn off all lamps when the tape player is stopped.

FIG. 26 illustrates an exemplary circuit for ensuring that all lamps remain off when tape output ceases. As may be noted, a reset pulse appears at the RESET output of counter 186 (FIG. 23) during each data segment. This pulse is fed to one input of NAND gate 194 of FIG. 26, and the other input is connected to the tape carrier detector signal appearing across network $R_9C_5$ (FIG. 11). Thus, whenever the tape is in motion, NAND gate 194 is disabled by the carrier detector signal, and no output occurs. When the tape signal stops and network $R_9C_5$ discharges, NAND gate 194 is enabled. The stream of reset pulses at the data segment rate (above 400 Hz) appears at the gate 194 output. This output is fed to the clock input to segment counter 150 (FIG. 15) causing it to count continuously. Since no data input is present, point I (FIG. 15) will be inactive (zero). This action resets all of the flip-flops 201 through 240 to the OFF position, thereby extinguishing all lamps. It is clear that counter 186 continues to count in the absence of tape signals since it is controlled by the scanning clock.

As may now be realized, I have provided a novel multiplexing and scanning circuit used in conjunction with my matrices capable of controlling 56 lamps and 17 additional functions from a 43 segment data frame, having only 15 output terminals and in which the majority of the electronic circuits can be implemented in a single MOS/LSI package. However, I am not to be limited to these numbers and arrangements as it may be clear to one skilled in the art that many variations, such as in the naumber of lamps, control functions, and sizes of the matrices and multiplexers may be made within the scope of my invention. As previously mentioned I have for the purposes of explanation indicated the abovedescribed implementation to involve commercially available integrated circuits such as types 74161, 74142, and 74151. Manifestly, this description is sufficient for an LSI designer to convert the circuits to an LSI chip wherein circuits equivalent to the IC's become an integral part of such chip.

With regard to the placement of illumination means within or adjacent the keys, I mean illumination means, such as lamps, so disposed as to cause the individual key or a portion thereof to become illuminated by any practical means.

My arrangements for illuminating keyboards vary according to their physical construction. In most pianos and some organ models I place a lamp within each individual key. In other instances, space permitting, I place lamps beneath the keys, resulting in a simpler installation. In such an installation, I sometimes use a fiber optic light guide to transmit more light from the lamp to the more distant under-surfaces of the black, or sharp, keys.

Since the black keys are normally opaque, I have my black keys molded from a translucent black material so that when my light source is applied, the resulting illumination is similar in appearance to an illuminated white key.

I claim:

1. An instructional device for a musical instrument having a keyboard, comprising a plurality of illumination means disposed within the keys of such instruments, a stereo cassette type tape player arranged for playing a prerecorded tape contained in a cassette, such tape containing aural instructions and coded instructional information, control means operatively connected to said plurality of illumination means, and decoder means responsive to such coded instructional information, said decoder means comprising signal conditioning means for accepting such coded instructional signals from such tape, whereby noise, interference, crosstalk and level variations originating from said tape player are effectively eliminated, and decoder memory means responsive to such conditioned signals whereby said control means are caused to selectively energize said plurality of illumination means singly and in various combinations and sequences, and for selected periods of time as determined by such instructional information.

2. The device as defined in claim 1 in which such coded instructional information is in the form of amplitude and width modulated segments of a sinusoidal carrier wave with each segment consisting of a group of high amplitude cycles and a group of low amplitude cycles, wherein a selected number of such segments forms a data frame, and in which said decoder means is arranged to be responsive to such amplitude and width modulated segments.

3. The device as defined in claim 2 in which said signal conditioning means comprises automatic gain control means responsive only to signals having frequencies occurring in a narrow band around the frequency of such sinusoidal carrier wave, whereby such coded instructional information signals are maintained at a selected level, squaring means responsive to such high amplitude cycles, said squaring means producing a sequence of constant amplitude square waves, with the number of such square waves being equal to the number of such high amplitude cycles, and pulse sampling and detection means, latter means sampling each of such square waves with a plurality of sampling pulses and arranged to reject false pulses due to noise, interference and crosstalk, thereby passing only true information-bearing pulses and rejecting false pulses due to noise, interference and crosstalk.

4. The device as defined in claim 2 in which one of such segments in such data frame carries a synchronization signal and the remainder of such segments carry data signals for control of said illumination means, with the time of occurrence of a segment with respect to such synchronization segment representing the address of a specific one of said illumination means, and in which said decoder means identifies the time of occurrence of each of such synchronization segments and is responsive to the time of occurrence of data signals in each of such remainder of segments with reference to such synchronization segment.

5. The device as described in claim 4 in which said decoder means causes illumination of selected ones of said illumination means when modulation indicative of a ONE is detected in such data carrying segments and causes selected ones of said illumination means to be non-illuminated when modulation indicative of a ZERO is detected in such data carrying segments.

6. The device as defined in claim 2 in which said control means includes at least one matrix means interposed between said decoder means and said illumination means, said matrix means arranged to energize a large number of said illumination means than the number of such data carrying segments required to cause said control means to energize said matrix means.

7. The device as described in claim 5 in which said decoder means is responsive to at least one such data carrying segment to control a function of such instrument.

8. The device as defined in claim 7 when utilized with such musical instrument having an automatic rhythm player, such automatic rhythm player having manual speed controls, said control means being responsive to a plurality of outputs of said decoder means to disable said automatic rhythm player from such manual speed control and to selectably control the speed and tempo of such automatic rhythm player in synchronism with the coded instructional information prerecorded on such tape, and at a speed and tempo determined by data prerecorded in a plurality of such segments.

9. The device as defined in claim 2 in which said control means includes multiplexing means and scanning means connected to said illumination means by a number of interconnection conductors, and arranged to control said illumination means whereby the number of said interconnection conductors between said illumination means and said multiplexing means is substantially less than the number of said illumination means.

10. The device as defined in claim 9 in which said plurality of illumination means are interconnected in an array having a plurality of rows and columns such that the product of the number of said rows and number of said columns is essentially equal to the number of said illumination means, and in which said scanning means causes each of said rows to be energized in sequence during each of such segments and in which said multiplexing means connects outputs from said decoder means to said columns in accordance with a predetermined pattern, whereby selected columns are energized in synchronism with such sequential energizing of said rows, and whereby said illumination means are thereby illuminated in response to such prerecorded instructional information.

11. The device defined in claim 10 in which said scanning means comprises clock means operating at a rate equal to the number of said rows multiplied by the rate of occurrence of such segments, and first counter means responsive to pulses from said clock means for producing a number of sequential output pulses that is equal to the number of said rows, as well as for producing a reset pulse occurring at the completion of such count, wherein such output pulses sequentially energize said rows, and in which said multiplexing means comprises second counter means for producing a sequence of binary coded pulses in response to pulses from said clock means and such reset pulse, a plurality of multiplexers, the number of said multiplexers being equal to number of said columns, said multiplexers being controlled in parallel by such binary coded pulses from said second counter means, wherein the number of such binary coded output pulses is equal to the number of said rows.

12. The device as defined in claim 2 in which said control means includes tape signal detection means, said latter means causing all of said illumination means to be set to a non-illuminated condition when the tape drive mechanism of said tape player is not operating at its normal forward speed.

13. The device defined in claim 2 in which said decoder comprises logic circuits responsive to the modulation pattern indicative of the start of a sequence in the first segment of the data frame, and to the modulation patterns indicative respectively of the ON and OFF conditions in the remaining segments of the data frame, said logic circuit sequentially causing illumination of all notes having their associated segments in the ON condition and sequentially causing the illumination to be extinguished for all notes illuminated during the previous data frame and for which their associated segments are in the OFF condition.

14. The device as defined in claim 1 in which the musical instrument used with said instruction device contains an automatic rhythm player, said control means being operatively interconnected with such automatic rhythm player so as to control its tempo in response to such prerecorded coded instructional information.

15. The device as defined in claim 1 in which selected ones of said illumination means provide functional instruction to the student in response to such coded information.

16. The device as defined in claim 15 in which such functional instruction is provided by chord change indication means, whereby an operator is alerted to forthcoming change of chord notes, and tab stop indication means whereby an operator is instructed to adjust indicated tab stops.

17. The device as defined in claim 2 in which chordal type information on occasion is involved, with at least one of such segments being allocated to the activation of an illumination means indicative of an impending chord change.

18. The device as defined in claim 2 in which said control means inludes tape speed indicator means, said latter means indicating by means of an indicator lamp when said tape player is operating at its normal speed within a selected tolerance.

19. The device as defined in claim 18 in which said indicator means includes means for comparing the frequency of such sinusoidal carrier wave with frequency reference means.

20. An electronic decoder and control device for accepting coded information from a tape player arranged to play a prerecorded magnetic tape containing such information in which the control device controls the illumination of a plurality of illumination means in response to such coded information, said electronic decoder and control device comprising decoder means responsive to such coded information prerecorded on the magnetic tape, a plurality of illumination means, control means for controlling the illumination of said illumination means and being connected to said decoder means, said control means having a number of control outputs at least as great as the number of said illumination means, multiplexing means and scanning means disposed between and connected to said control outputs and said illumination means by a number of interconnection conductors, wherein the number of interconnection conductors between said illumination means and said multiplexing and scanning means is significantly less than the number of said illumination means.

21. The device as defined in claim 20 in which such coded information is in the form of amplitude and width modulated segments of a sinusoidal carrier wave, with each segment consisting of a group of high amplitude cycles and a group of low amplitude cycles, wherein a selected number of such segments form a data frame, and in which said decoder means is arranged to be responsive to such amplitude and width modulated segments.

22. The device as defined in claim 21 in which signal conditioning means are utilized for accepting the coded information, latter means including automatic gain control means responsive only to signals having frequencies occurring in a narrow band around the frequency of such sinusoidal carrier wave, whereby such coded instructional information signals are maintained at a selected level, means for converting a sequence of such high amplitude cycles to a sequence of constant amplitude square waves, and pulse sampling and detection means for sampling each of such square waves with a plurality of sampling pulses and arranged to reject false pulses due to noise, interference and crosstalk.

23. The device as defined in claim 20 in which said illumination means are disposed within or adjacent selected keys of a keyboard instrument.

24. The device as defined in claim 20 in which said illumination means are disposed adjacent selected frets of a fretted instrument.

25. The device as defined in claim 20 in which aural instruction is provided on the magnetic tape, accompanying and supplementing the coded information.

26. An electronic decoder and control device for accepting coded information signals from a tape player arranged to play a prerecorded magnetic tape containing such coded information signals, in which the control device controls the illumination of a plurality of illumination means in response to such coded information signals, and in which at least a portion of the electronic circuits of said device are fabricated by means of large scale integration on a single semiconductor chip, said chip being mounted in a package having fewer external terminals for interconnection with the plurality of illumination means than the number of said illumination means, said electronic decoder and control device comprising decoder means responsive to coded information prerecorded on such magnetic tape, a plurality of illumination means, control means for controlling the illumination of said illumination means and being connected to said decoder means, said control means having a number of control outputs at least as great as the number of said illumination means, multiplexing means and scanning means disposed between and connected to said control outputs and said illumination means by a number of interconnection conductors, wherein the number of interconnection conductors between said illumination means and said multiplexing and scanning means is significantly less than the number of said illumination means.

27. An electronic decoder and control device for accepting coded information signals from a tape player arranged to play a prerecorded magnetic tape containing such coded information signals, in which the control device controls the illumination of a plurality of illumination means, said electronic decoder and control device comprising decoder means having a plurality of outputs, said decoder means being responsive to such coded information signals received from such tape player, thereby energizing each of said outputs for which the prerecorded magnetic tape is selectively prerecorded, a plurality of illumination means, control means connected to said illumination means for controlling the illumination thereof, matrix means connected to said decoder outputs, said matrix means having two groups of input terminals and one group of matrix output terminals, in which the number of said matrix output terminals is equal to the product of the number of said input terminals in each of said two groups of input terminals, and in which such number are selected to provide a greater number of said matrix output terminals than the total number of said input terminals, said group of matrix output terminals being connected to said control means, whereby said control means selectively causes illumination of said illumination means.

28. The electronic decoder and control device as defined in claim 27 in which said device includes a plurality of said matrix means.

29. In a musical instrument which includes a set of tone signal generators, an output transducer, and at least one set of manually operated keys for controlling the transmission of corresponding tone signals to said transducer, programmable player instruction apparatus comprising:

a set of illumination means each mounted in operative association with one of said keys; and programming means for operating selective subsets of said illumination means in prearranged sequences to signal subsets of keys to be operated to produce a musical program, said programming means comprising:

analog data storage means for supplying a prerecorded sequence of encoded binary data signals grouped in frames;

decoder means for decoding each of said encoded binary data signals in sequence;

storage means for providing buffered storage of each of said decoded data signals in each frame in an associated binary digital storage element; and addressing means for operatively addressing said illumination means to operate selective subsets thereof in accordance with at least a portion of said stored data signals.

30. Apparatus as claimed in claim 29 wherein said instruction apparatus further comprises a plurality of rhythm voice generators and said programming means further comprises circuit means for operating respective ones of said rhythm voice generators in accordance with a portion of said stored data signals to produce a rhythm accompaniment at a tempo synchronized with the tempo of said musical program.

31. Apparatus as claimed in claim 29 wherein said musical instrument further includes an automatic rhythm pattern generator responsive to input clock signals to produce patterns of rhythm voices at a tempo corresponding to the rate of said clock signals, and said programming means further comprises:

a programmed clock responsive to a portion of said stored data signals to supply clock signals at a preprogrammed rate to said automatic rhythm pattern generator, whereby the tempo of said rhythm pattern generator is synchronized with the tempo of said musical program.

32. Apparatus as claimed in claim 29 wherein at least one subset of said illumination means is grouped in n groups of m individual illumination means each; and said means for addressing and operating said illumination means comprise a data decoding matrix receiving n stored data signals for addressing said n groups of illumination means and m stored data signals for addressing individual illumination means within said n groups, such that during each data frame any illumination means in one of said groups may be operated.

33. Apparatus as claimed in claim 29 wherein said illumination means are operatively grouped in a rectangular matrix with individual row and column operating leads; and said means for addressing and operating said illumination means comprises:
  multiplexing means responsive to control signals for multiplexing data signals from said storage means onto said column operating leads; and
  multiplexing control means for supplying control signals to said multiplexing means and corresponding operating signals to said row operating leads in sequence, whereby successive row groupings of illumination means are operated in accordance with said stored data signals.

34. Apparatus as claimed in claim 29 wherein said illumination means are operatively grouped in a rectangular matrix with individual row and column operating leads and at least one subset of said illumination means is addressively grouped in $n$ groups of $m$ individual illumination means each; and said means for addressing and operating said illumination means comprises:
  at least one data decoding matrix receiving n stored data signals for addressing said n groups of illumination means and receiving m stored data signals for addressing individual illumination means within each of said n groups and generating a number of data signals equal to the product of n and m;
  multiplexing means responsive to control signals for multiplexing data signals from said storage means and said decoding matrix onto said column operating leads; and
  multiplexing control means for supplying control signals to said multiplexing means and corresponding operating signals to said row operating leads in sequence, whereby successive row groupings of said illumination means are operated in accordance with said stored data signals.

* * * * *